US008751055B2

(12) United States Patent
Kake et al.

(10) Patent No.: US 8,751,055 B2
(45) Date of Patent: Jun. 10, 2014

(54) DISTRIBUTED POWER SUPPLY SYSTEM

(75) Inventors: Nin Kake, Nara (JP); Hiroaki Kaku, Shiga (JP); Keiichi Sato, Kyoto (JP); Hiroshi Nagasato, Shiga (JP); Akihito Ootani, Hyogo (JP)

(73) Assignee: Panasonic Corporation, Osaka (JP)

( * ) Notice: Subject to any disclaimer, the term of this patent is extended or adjusted under 35 U.S.C. 154(b) by 398 days.

(21) Appl. No.: 13/203,910

(22) PCT Filed: Dec. 10, 2010

(86) PCT No.: PCT/JP2010/007207
§ 371 (c)(1),
(2), (4) Date: Aug. 30, 2011

(87) PCT Pub. No.: WO2011/070792
PCT Pub. Date: Jun. 16, 2011

(65) Prior Publication Data
US 2011/0313590 A1    Dec. 22, 2011

(30) Foreign Application Priority Data

Dec. 10, 2009  (JP) .................................. 2009-280270

(51) Int. Cl.
G05D 11/00   (2006.01)
G01R 19/00   (2006.01)
G06F 11/30   (2006.01)

(52) U.S. Cl.
USPC .............. 700/293; 700/297; 702/64; 702/183

(58) Field of Classification Search
None
See application file for complete search history.

(56) References Cited

U.S. PATENT DOCUMENTS 3,559,114 A * 1/1971 Fjallbrant ..................... 333/173
5,390,154 A * 2/1995 DiLoreto ........................ 367/98
5,907,670 A * 5/1999 Lee ............................... 714/4.1
(Continued)

FOREIGN PATENT DOCUMENTS

JP       05-034580 U    5/1993
JP     2002-286785 A   10/2002
(Continued)

OTHER PUBLICATIONS

International Search Report for International Application No. PCT/JP2010/007207, dated Feb. 22, 2011, 2 pages.
(Continued)

Primary Examiner — Sean Shechtman
(74) Attorney, Agent, or Firm — McDermott Will & Emery LLP

(57) ABSTRACT

A distributed power supply system of the present invention comprises a distributed power supply apparatus (4) for supplying electric power to a customer load (2) interactively with a commercial electric power utility (1); an internal load (7) supplied with electric power from the commercial electric power utility; a current sensor (5a, 5b) for detecting a magnitude of a current and a direction of the current, the current being in a location closer to the commercial electric power utility than the internal load and the customer load; and a controller (8); wherein in a state where the distributed power supply apparatus 84) is not generating the electric power, the controller causes the internal load (7) to actuate, performs determination control as to an installation state of the current sensor (5a, 5b) plural times based on a value detected by the current sensor, and performs the determination control in such a manner that at least one of plural intervals at which the determination control is performed is set to an interval other than an integral multiple of another interval of the plural intervals.

20 Claims, 34 Drawing Sheets

(56) References Cited

U.S. PATENT DOCUMENTS

| | | | |
|---|---|---|---|
| 6,266,738 B1* | 7/2001 | Kobayashi | 711/106 |
| 2001/0019417 A1* | 9/2001 | Ueki | 358/1.9 |
| 2002/0175209 A1* | 11/2002 | Itoh | 235/462.25 |
| 2006/0219575 A1* | 10/2006 | Oberlin | 205/775 |
| 2007/0056352 A1* | 3/2007 | Birkhofer et al. | 73/23.21 |
| 2009/0128157 A1* | 5/2009 | Moriya | 324/426 |
| 2009/0144002 A1* | 6/2009 | Zettel et al. | 702/64 |
| 2009/0271089 A1* | 10/2009 | Sekimoto | 701/103 |
| 2010/0096927 A1* | 4/2010 | Miyauchi et al. | 307/64 |

FOREIGN PATENT DOCUMENTS

| | | |
|---|---|---|
| JP | 2004-297959 A | 10/2004 |
| JP | 2006-042514 A | 2/2006 |
| JP | 2009-118673 A | 5/2009 |

OTHER PUBLICATIONS

Extended European Search Report issued in European Application No. 10835715.3 dated Nov. 5, 2013, 5 pages.

* cited by examiner

Fig. 11
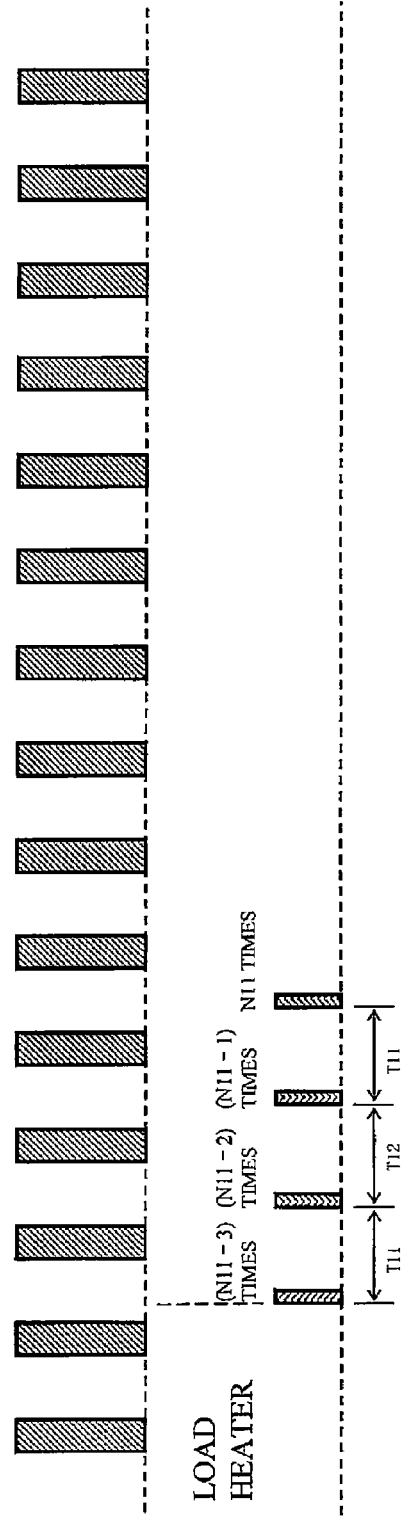
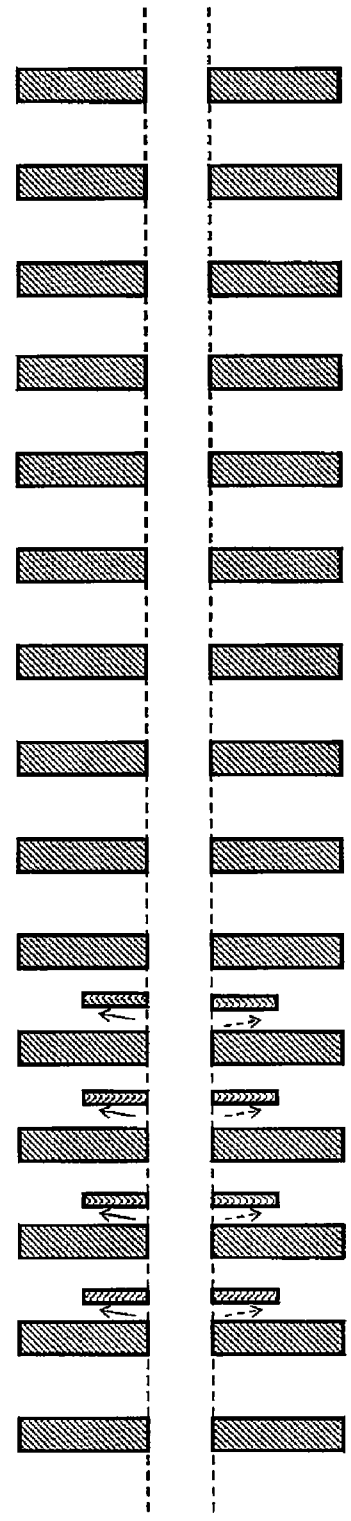

Fig. 14
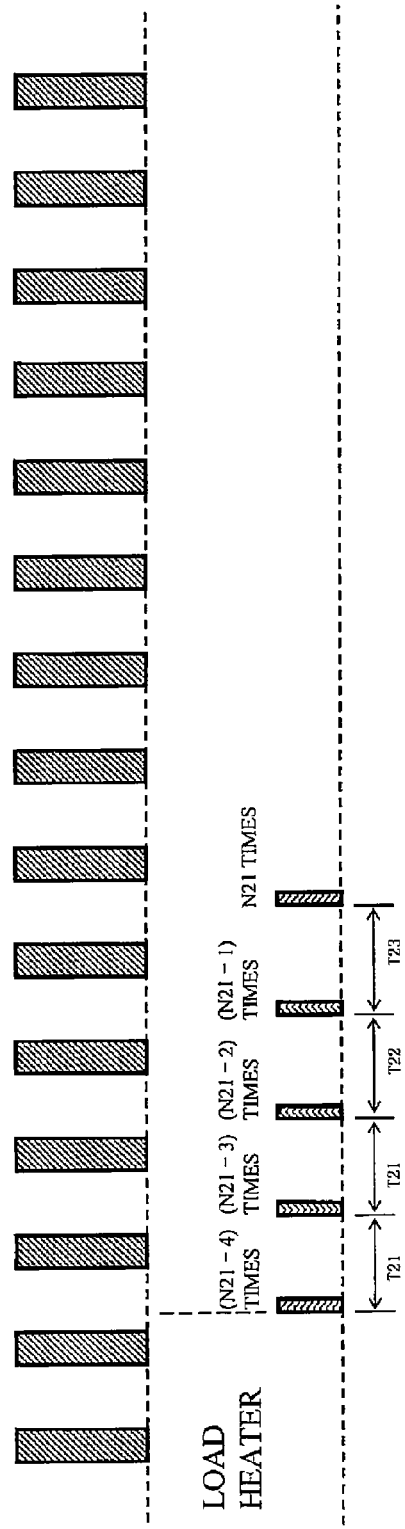
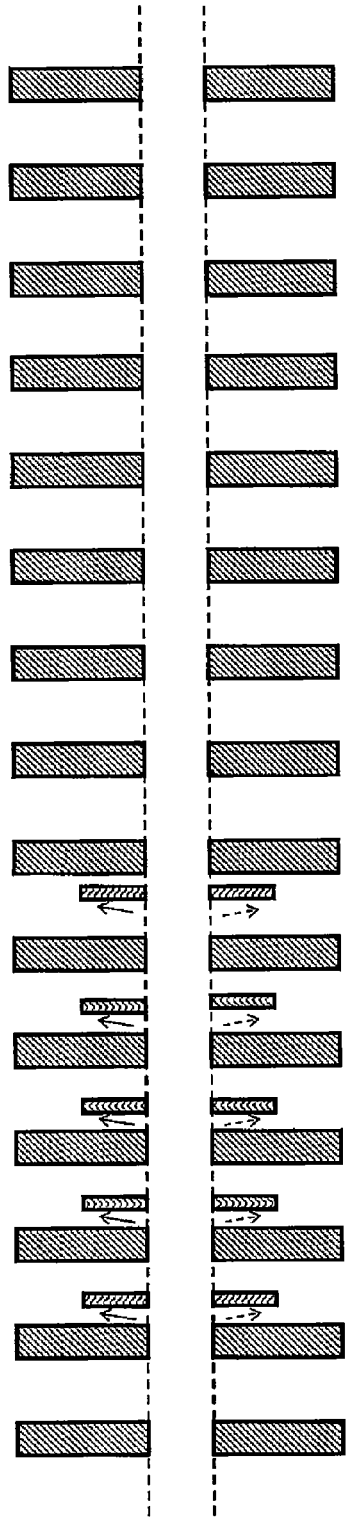

Fig. 24
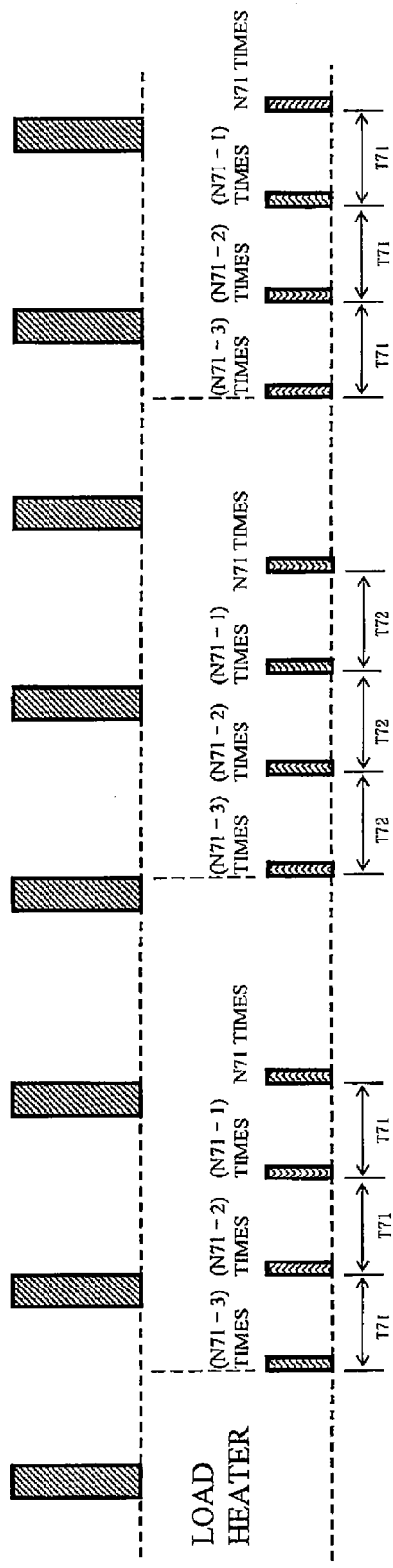
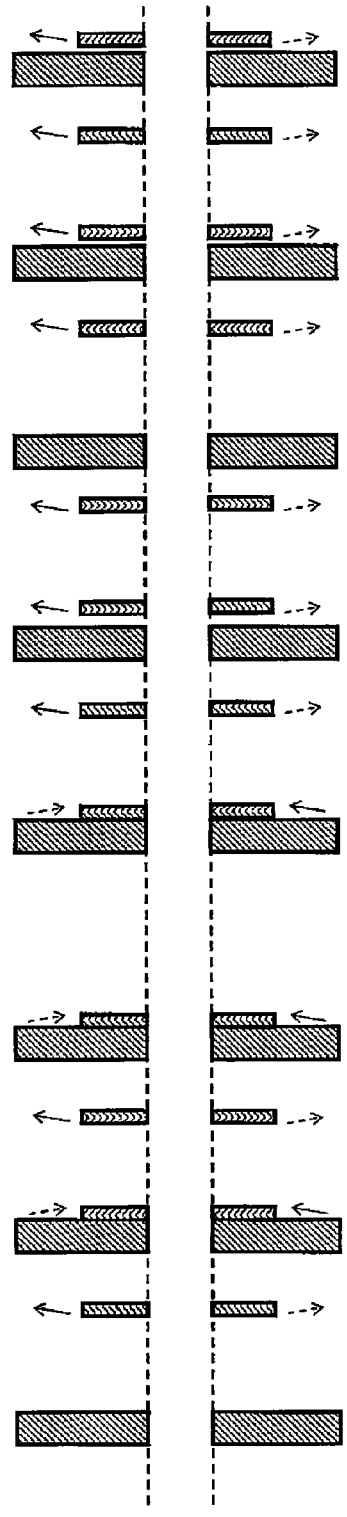

Fig. 26
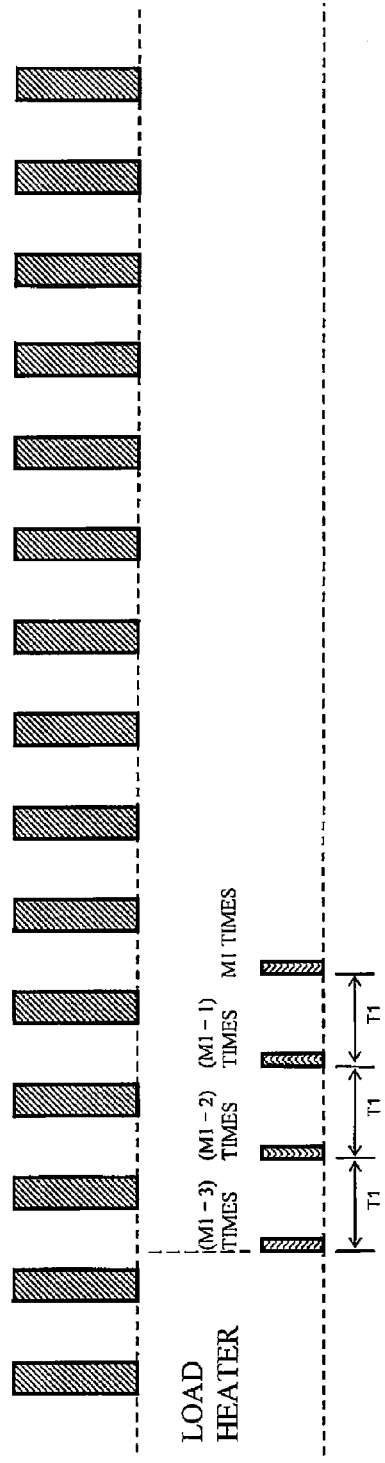
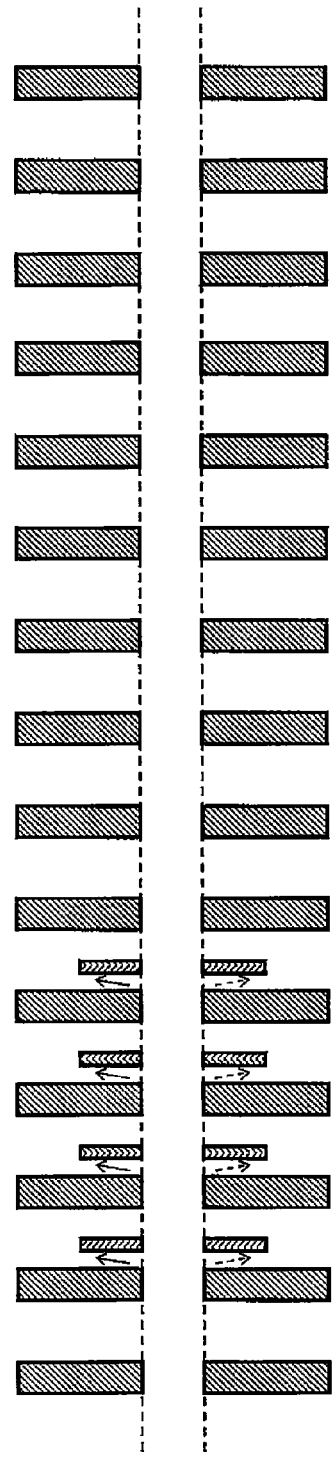

CASE 2 WHERE NORMAL CONTROL IS ACCOMPLISHED IN PRIOR ART EXAMPLE
CUSTOMER LOAD (LAUNDRY MACHINE, ETC.)

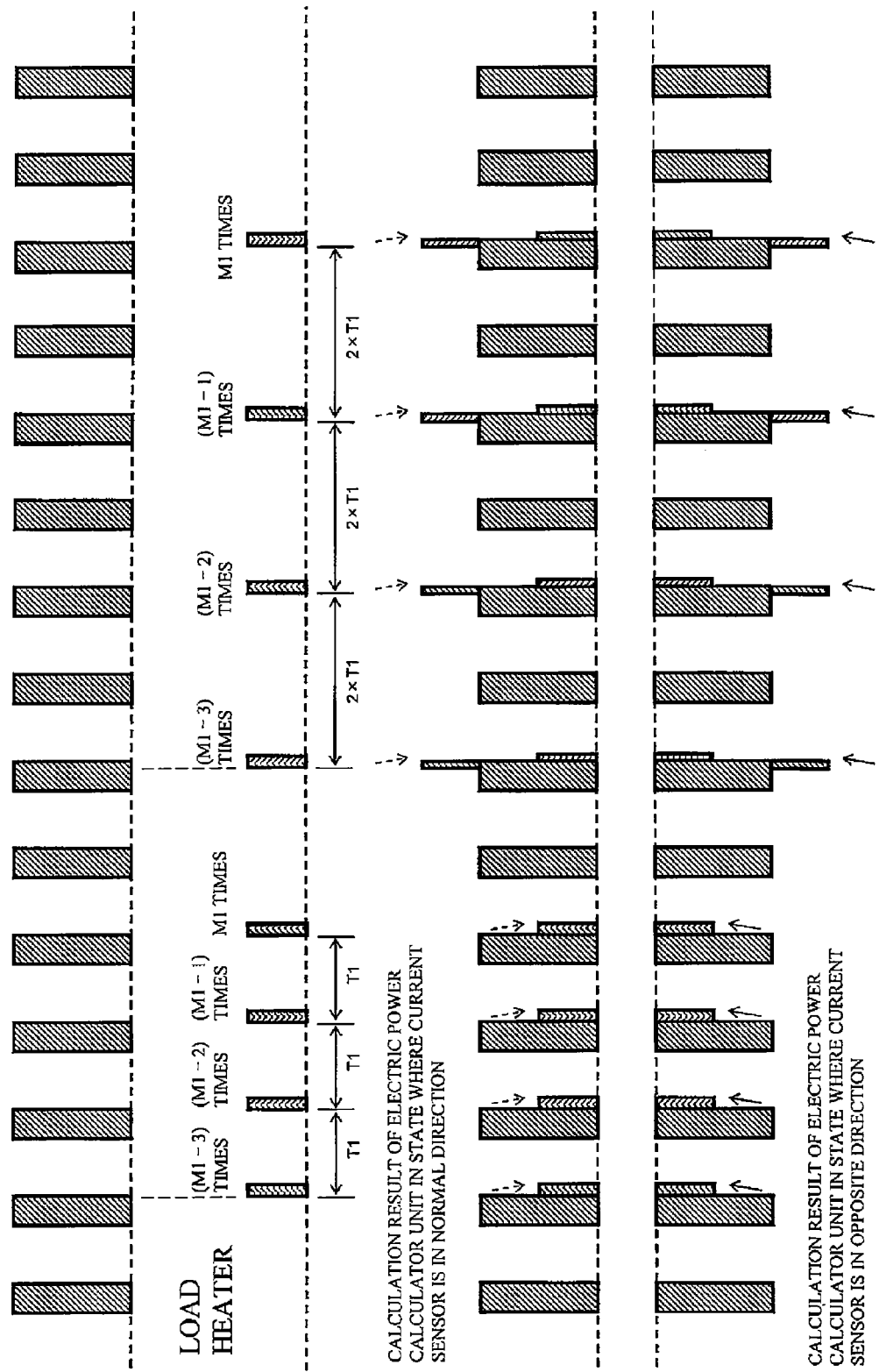

DISTRIBUTED POWER SUPPLY SYSTEM

This application is a 371 application of PCT/JP2010/007207 having an international filing date of Dec. 10, 2010, which claims priority to JP2009-280270 filed on Dec. 10, 2009, the entire contents of which are incorporated herein by reference.

TECHNICAL FIELD

The present invention relates to a distributed power supply system which supplies electric power to a commercial electric power utility and a customer load interactively with the commercial electric power utility.

BACKGROUND ART

Conventionally, as the distributed power supply system of this kind, there is a home (in-house) power generation system disclosed in Patent Literature 1.

Hereinafter, a distributed power supply system disclosed in Patent Literature 1 will be described with reference to the drawings.

FIG. 10 is a block diagram of a conventional distributed power supply system disclosed as FIG. 1 in Patent Literature 1. Reference symbols depicted in FIG. 10 are changed from original ones by the applicant. As shown in FIG. 10, the conventional distributed power supply system includes current sensors 105a, 105b, a voltage sensor 106, a heater 107 and a control means 108. When an electric power value calculated from a current value detected by the current sensor 105a, 105b and a voltage value detected by the voltage sensor 106 is not more than a predetermined value, in a case where the heater 107 is actuated and a current flows in a state where a fuel cell system 104 is not generating electric power, the control means 108 inverts a positive/negative sign of the electric power value calculated thereafter.

This makes it possible to determine a direction in which the current sensor is installed and correct the electric power value, regardless of a state of the home load.

The determination as to the direction in which the current sensor 105a, 105b is installed may be performed plural times for the purpose of higher reliability.

Patent Literature 1: Japanese Laid-Open Patent Application Publication No. 2009-118673

SUMMARY OF THE INVENTION

Technical Problem

However, in the conventional configuration, even when the determination as to the direction in which the current sensor (installation direction of the sensor) is installed is performed plural times, it cannot be performed accurately in some occasions. The inventors of the present invention studied a cause intensively and discovered that the cause was that supplying of electric power to the heater synchronizes with supplying of electric power to a motor of a customer load, for example, a laundry machine or air conditioning equipment placed at home, in the determination as to the installation direction of the current sensor.

Since the electric power is supplied periodically to the heater in a state where the fuel cell system is not generating electric power in order to determine the installation of the current sensor, the electric power flowing through electric cables to which the current sensor and the voltage sensor are connected changes periodically. In an embodiment (Embodiment 2) in the conventional configuration, the control means detects a magnitude of a periodic electric power change associated with the heater to determine the installation direction of the current sensor. When the periodic electric power change associated with the heater synchronizes with a change in the electric power supplied to the customer load and thereby supplying of the electric power to the customer load stops while the electric power starts to flow through the heater, the electric power value calculated from the detected value of the current sensor and the detected value of the voltage sensor changes less with respect to a power consumption amount of the heater, or decreases, even after supplying of the electric power to the heater starts. The control means detects this small change magnitude of the electric power value or a reduction magnitude of the electric power value and determines the installation direction of the current sensor based on them. So, the control means misdetermines that the current sensor is abnormal, for example, the current sensor fails, is disconnected or is disengaged from the electric cable, or that the current sensor is installed in an opposite direction to the normal direction, even if the current sensor is actually installed in a normal direction. Thus, in some occasions, the control means cannot determine the installation direction of the current sensor normally. In another embodiment (Embodiment 1) of the conventional configuration, electric power is supplied from the commercial electric power utility to the heater in a state where the fuel cell system is not generating the electric power, and the control means detects whether or not the current detected by the current sensor is positive to thereby determine the installation direction of the current sensor. However, in some occasions, zero point of the current sensor is not corrected but is deviated. For this reason, for example, if the zero point of the current sensor is significantly deviated to a minus side, in the case where the control means detects whether or not the electric power value is positive to thereby determine the installation direction of the current sensors, instead of based on a change in the electric power value, the current value detected by the current sensor is still a minus value even after the electric power is supplied to the heater. In this case, even if the current sensor is installed in the correct direction, the current sensor could detect the minus current value and the control means could misdetermine that the current sensor is installed in the opposite direction.

As described above, in the conventional configuration, there is a problem that determination as to the installation direction of the current sensor cannot be performed accurately in some cases.

The present invention is directed to solving the problem associated with the prior art, and an object of the present invention is to provide a distributed power supply system which is capable of more surely performing determination as to the installation direction of the current sensor and of improving reliability of the system.

Solution to Problem

To solve the above described problem, a distributed power supply system of the present invention comprises a distributed power supply apparatus for supplying electric power to a customer load interactively with a commercial electric power utility; an internal load configured to be supplied with electric power from the commercial electric power utility; a current sensor for detecting a magnitude of a current and a direction of the current, the current being in a location closer to the commercial electric power utility than the internal load and the customer load; and a controller; wherein in a state where the distributed power supply apparatus is not outputting the electric power, the controller causes the internal load to actuate, performs determination control as to an installation state of the current sensor plural times based on a value detected by the current sensor, and performs the determination control in such a manner that at least one of plural intervals at which the determination control is performed is set to an interval other than an integral multiple of another interval of the plural intervals.

The above and further objects, features and advantages of the present invention will more fully be apparent from the following detailed description of preferred embodiments with accompanying drawings.

Advantageous Effects of the Invention

A distributed power supply system of the present invention can perform determination as to an installation state of a current sensor more surely, and can therefore improve reliability of the system.

BRIEF DESCRIPTION OF THE DRAWINGS

FIG. 11 is a schematic view showing exemplary determination control of Embodiment 1 of the present invention.

FIG. 14 is a schematic view showing exemplary determination control of Embodiment 1 of the present invention.

FIG. 24 is a schematic view showing exemplary determination control of Embodiment 2 of the present invention.

FIG. 26 is a schematic view showing determination control of Comparative Example.

FIG. 32 is a schematic view showing determination control of Comparative Example.

DETAILED DESCRIPTION OF THE PREFERRED EMBODIMENTS

Figure 1:
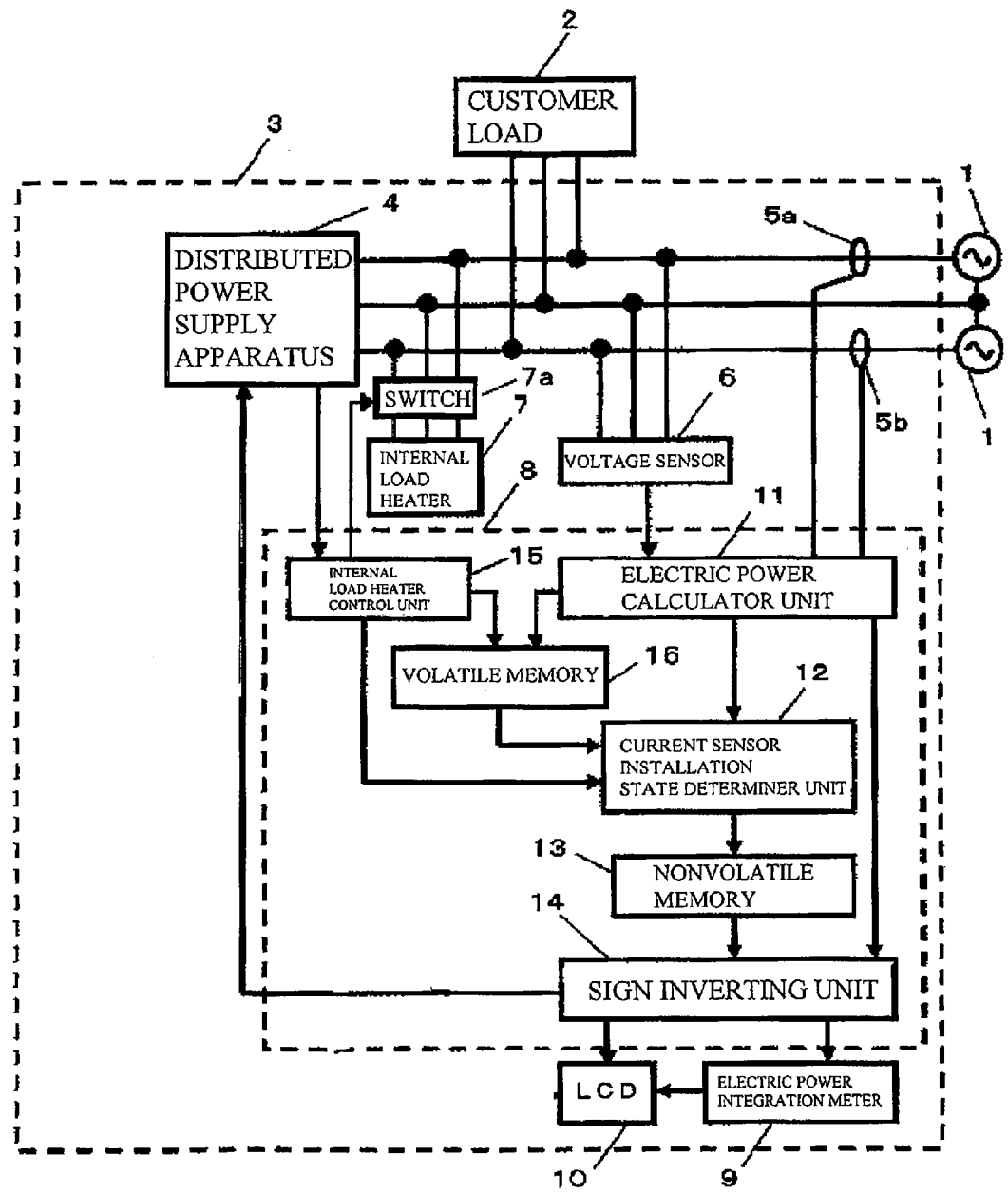
FIG. 1 is a block diagram of a distributed power supply system of Embodiment 1.

A first invention is a distributed power supply system comprising a distributed power supply apparatus for supplying electric power to a customer load interactively with a commercial electric power utility; an internal load configured to be supplied with electric power from the commercial electric power utility; a current sensor for detecting a magnitude of a current and a direction of the current, the current being in a location closer to the commercial electric power utility than the internal load and the customer load; and a controller; wherein in a state where the distributed power supply apparatus is not outputting the electric power, the controller causes the internal load to actuate, performs determination control as to an installation state of the current sensor plural times based on a value detected by the current sensor, and performs the determination control in such a manner that at least one of plural intervals at which the determination control is performed is set to an interval other than an integral multiple of another interval of the plural intervals. As used herein, the installation state of the current sensor is meant to include at least either the installation direction (positive or negative direction) of the current sensor, or a mounted state (disconnection, failure of a current sensor, disengagement from an electric cable, etc.) of the current sensor.

In accordance with the present invention, it can be determined more surely whether or not the current sensor cannot perform detection normally, which would be caused by incorrect installation direction of the current sensor, or the fact that the current sensor fails, is disconnected or is disengaged from the electric cable, and the electric power value can be corrected, regardless of the state of the customer load. Thus, reliability of the system can be improved.

A second invention is a distributed power supply system according to the first invention, wherein the controller performs the determination control in such a manner that the interval at which the determination control is performed is changed plural times such that each of the intervals is other than the integral multiple of another interval.

In accordance with the present invention, it is possible to avoid misdetermination which would occur when the determination control is performed at intervals each of which is an integral multiple of another interval.

A third invention is a distributed power supply system according to the first invention, wherein the controller executes a first step of performing the determination control at first intervals plural times and a second step of performing the determination control at second intervals plural times; the controller decides, for each step, a result of determination as to the installation state of the current sensor as each step, based on the determination control performed plural times in each step; and the controller executes the second step in such a manner that at least one of the second intervals is set to an interval other than an integral multiple of the first interval.

In accordance with the present invention, it is possible to avoid misdetermination which would occur when the determination control is performed at intervals each of which is an integral multiple of another interval. In addition, since the step of determining the installation state of the current sensor is carried out twice, the determination can be performed more surely.

A fourth invention is a distributed power supply system according to the third invention, wherein the controller executes the second step in such a manner that all of the second intervals are set equal.

In accordance with the present invention, the determination control can be simplified.

A fifth invention is a distributed power supply system according to the third invention or the fourth invention, wherein the controller executes the first step and the second step until results of determination as respective steps which are decided in the steps of last plural times become the same.

In accordance with the present invention, it is possible to determine the installation state of the current sensor more surely.

A sixth invention is a distributed power supply system according to the third invention or the fourth invention, wherein the controller executes the first step and the second step until results of determination as respective steps which are decided in the steps become the same at specified times or more times.

In accordance with the present invention, it is possible to determine the installation state of the current sensor more surely.

A seventh invention is a distributed power supply system, wherein the controller executes the first step and the second step until results of determination as respective steps which are decided in the steps become the same at a specified rate or higher rate.

In accordance with the present invention, it is possible to determine the installation state of the current sensor more surely.

An eighth invention is a distributed power supply system according to any one of the fifth to seventh inventions, wherein the controller executes the first step and the second step alternately.

A ninth invention is a distributed power supply system according to any one of the third to eighth inventions, wherein when determination results of the determination control become the same at specified times or more times in the first step or in the second step, the same determination result is decided as determination result as the corresponding step.

In accordance with the present invention, it is possible to determine the installation state of the current sensor more surely.

A tenth invention is a distributed power supply system according to any one of the third to eighth inventions, wherein when determination results of the determination control become the same at a specified rate or higher rate in the first step or in the second step, the same determination result is decided as determination result as the corresponding step.

In accordance with the present invention, it is possible to determine the installation state of the current sensor more surely.

An eleventh invention is a distributed power supply system according to the first invention, wherein the controller performs the determination control plural times in such a manner that the interval at which the determination control is performed is changed continuously such that each of the intervals is other than the integral multiple of another interval.

A twelfth invention is a distributed power supply system according to any one of the first to eleventh inventions, further comprising: a voltage detector for detecting a voltage of the electric power supplied from the commercial electric power supply utility to at least one of the internal load and the customer load; wherein in the determination control, the controller determines that the current sensor is abnormal when a deviation between an electric power value calculated from a value detected by the current sensor and a value detected by the voltage detector just before the internal load is actuated, and an electric power value calculated from a value detected by the current sensor and a value detected by the voltage detector just after the internal load is actuated, is not more than a first predetermined value which is a positive electric power value and is not less than a second predetermined value which is a negative electric power value, the controller determines that the current sensor is installed in an opposite direction when the electric power values are less than the second predetermined value; and the controller determines that the current sensor is installed in a correct direction when the electric power values are more than the first determined value. As used herein, the abnormal state of the current sensor refers to a state where the current sensor cannot detect a current normally due to the fact that the current sensor fails, is disengaged from the electric cable, or is disconnected.

In accordance with the present invention, it is determined whether or not there is a response to the actuation of the internal load (whether or not there is a failure), as well as it is determined whether the current sensor is installed in the normal or opposite direction. Also, in the case where reverse power flow is not occurring during the power generation, the installation direction of the current sensor can be determined.

A thirteenth invention is a distributed power supply system according to one of the first to eleventh inventions, further comprising: a voltage detector for detecting a voltage of the electric power supplied from the commercial electric power supply utility to at least one of the internal load and the customer load; wherein in the determination control, the controller determines that the installation direction of the current sensor is abnormal, when an electric power value calculated from a value detected by the current sensor and a value detected by the voltage detector is not more than a third predetermined value which is a positive electric power value and is not less than a fourth predetermined value which is a negative electric power value, the controller determines that the current sensor is installed in an opposite direction when the electric power value is less than the fourth predetermined value; and the controller determines that the current sensor is installed in a correct direction when the electric power value is more than the third determined value.

In accordance with the present invention, it is determined whether or not there is a response to the actuation of the internal load (whether or not there is a failure), as well as it is determined whether the current sensor is installed in the normal or opposite direction.

A fourteenth invention is a distributed power supply system according to the twelfth or thirteenth invention, wherein when it is determined that the current sensor is installed in the opposite direction based on the determination control performed plural times, the controller inverts a sign of the electric power value calculated from the value detected by the current sensor and the value detected by the voltage sensor, and outputs an electric power value with the inverted sign.

In accordance with the present invention, a power generation operation can be carried out normally without re-installing the current sensor in the normal direction.

A fifteenth invention is a distributed power supply system according to the first to fourteenth inventions, further comprising: a notification means for notifying abnormality; wherein the controller decides final determination result of the installation state of the current sensor based on the determination control performed plural times, and causes the notification means to notify the abnormality when the controller does not decide the final determination result within a predetermined time.

In accordance with the present invention, it is possible to notify that there is an installation problem such as an error in the installation direction of the current sensor, disconnection or disengagement (disengagement of the current sensor from the electric cable) during installation work and maintenance operation, and to notify that there is a failure such as disconnection or disengagement of the current sensor after the system is installed. As a result, reliability of the installation work, reliability of the maintenance operation and reliability of the system can be improved.

A sixteenth invention is a distributed power supply system according to the twelfth invention or the thirteenth invention, wherein the controller executes a first step of performing the determination control at first intervals plural times, determines whether or not the current sensor is installed in a correct direction based on the determination control performed plural times in the first step, terminates the determination control when the installation direction of the current sensor is decided, and executes a second step of performing the determination control plural times at second intervals at least one of which is an interval other than an integral multiple of the first interval to determine whether the current sensor is installed in the correct direction or in the opposite direction based on the determination control performed plural times in the second step, when it is decided that the installation direction of the current sensor is abnormal.

In accordance with the present invention, it is possible to determine the installation state of the current sensor more surely.

A seventeenth invention is a distributed power supply system according to the fifteenth invention, wherein the controller sets an interval of the determination control at which the installation state of the current sensor is decided as a default interval at which determination control is performed plural times next time.

In accordance with the present invention, it is possible to determine the installation state of the current sensor more surely and quickly.

Hereinafter, embodiments of a distributed power supply system of the present invention will be described with reference to the drawings. Note that the embodiments are in no way intended to limit the present invention.

Embodiment 1

FIG. 1 is a block diagram of a distributed power supply system of Embodiment 1 of the present invention.

As shown in FIG. 1, a commercial electric power utility 1 which is a single-phase three-wire AC power supply composed of U-phase, O-phase and W-phase is interconnected to a customer load 2 which consumes AC power supplied from the commercial electric power utility 1.

A distributed power supply system 3 interconnected (interactively connected) to the commercial electric power utility 1 includes a distributed power supply apparatus 4 which outputs generated electric power as AC power, the customer load 2, current sensors 5a, 5b installed in U-phase and W-phase within a distribution board installed at a point at which the distributed power supply apparatus 4 receives power from the commercial electric power utility 1 and which is upstream of the customer load 2 (in the present embodiment, current sensor 5a in U-phase and current sensor 5b in W-phase), each current sensor detecting a magnitude and positive/negative direction of a current, a voltage sensor 6 which is a voltage detection means for detecting a voltage in the commercial electric power utility 1, an internal load heater 7, a switch 7a for turning ON/OFF the internal load heater 7, a control means (controller) 8 for controlling the distributed power supply system 3, an electric power integration meter 9 for integrating an electric power value, and a LCD10 which is a display means and notification means for displaying electric power and an abnormal state of the system.

The control means 8 includes an electric power calculator unit 11 for calculating an electric power value for each of the U-phase and W-phase based on the current value detected by the current sensor 5a, 5b and the voltage value detected by the voltage sensor 6 (in the present embodiment, a state where reverse power flow from the distributed power supply system 3 to the commercial electric power utility 1 occurs is minus), a volatile memory 16 for storing the electric power value calculated by the electric power calculator unit 11, a current sensor installation state determiner unit 12 for performing determination as to the installation state of the current sensor 5a, 5b,0 a nonvolatile memory 13 for storing a result of determination performed by the current sensor installation state determiner unit 12, a sign inverting unit 14 for correcting a positive/negative sign of the electric power value calculated in the electric power calculator unit 11 based on information about the installation direction of the current sensor 5a, 5b which is stored in the nonvolatile memory 13, and an internal load heater control unit 15 for controlling feeding of electric power to the internal load heater 7 via the switch 7a.

Figure 2:
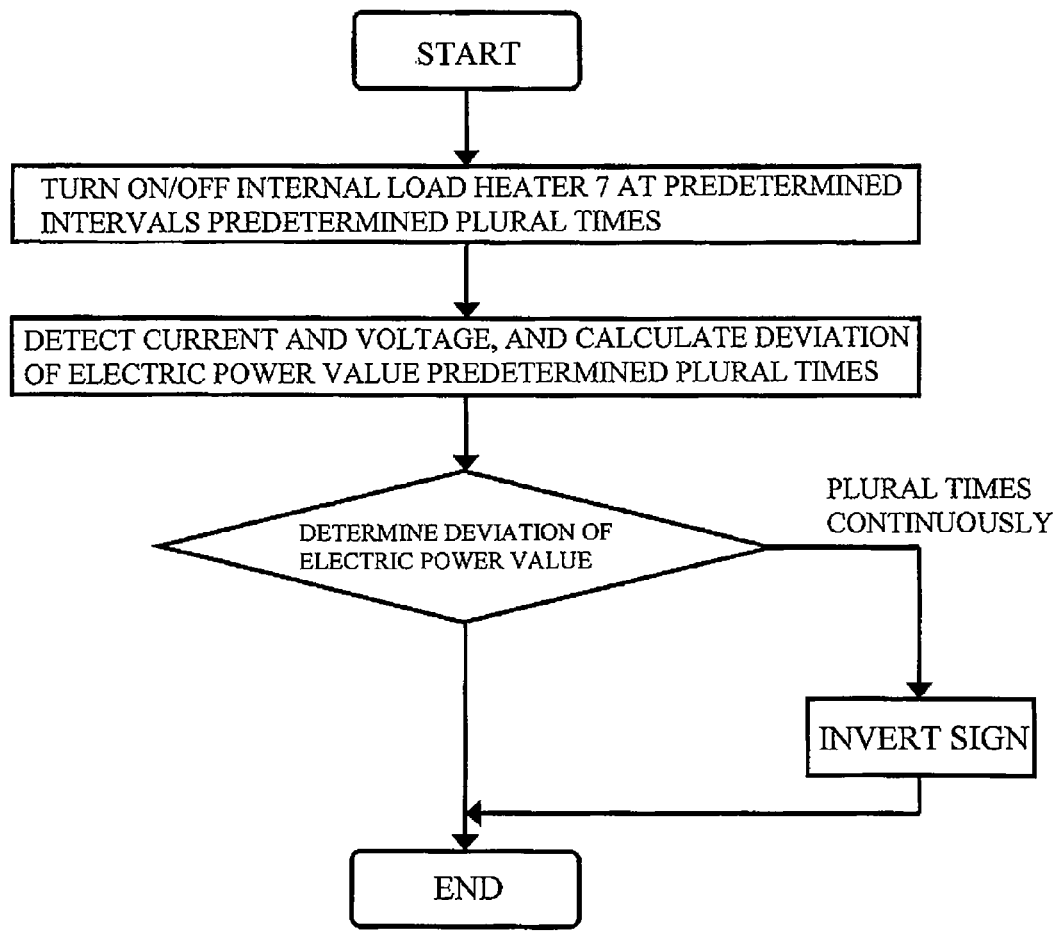
FIG. 2 is a flowchart showing a flow of determination as to the installation state of current sensor in the distributed power supply system of Embodiment 1.
Figure 3:
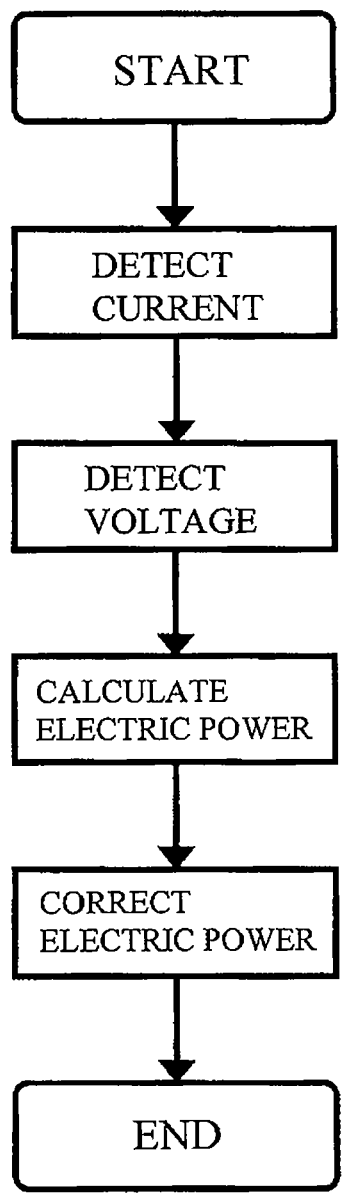
FIG. 3 is a flowchart showing a flow of calculation and correction of electric power in the distributed power supply system of Embodiment 1.

FIG. 2 is a flowchart showing a flow of determination as to the installation state of the current sensor in the distributed power supply system of Embodiment 1. FIG. 3 is a flowchart showing a flow of calculation and correction of electric power in the distributed power supply system of Embodiment 1.

The operation and function of the distributed power supply system configured as described above will be described with reference to FIGS. 1, 2, and 3.

The control means 8 performs determination as to the installation state of the current sensor 5a, 5b when power is ON. After performing determination as to the installation state of the current sensor 5a, 5b, electric power is calculated and corrected all the time, and determination as to the installation state of the current sensor 5a, 5b is performed on a regular basis to address situations where the installation direction of the current sensor 5a, 5b is changed by a person, and the current sensor 5a, 5b fails, is disconnected or disengaged from electric cable. As used herein, the installation state of the current sensor(s) 5a, 5b means at least either the installation direction of the current sensor(s) 5a, 5b, or cases where the current sensor(s) 5a, 5b fail(s), is/are disconnected or disengaged from the electric cable(s).

Hereinafter, description will be given of a determination method (determination control) of the installation state of the current sensor 5a, 5b.

The control means 8 causes the internal load heater control unit 15 to turn ON/OFF the internal load heater 7 at predetermined intervals predetermined plural times (e.g., the predetermined interval is one~three seconds and preferably one second, and the predetermined plural times is three~five times and preferably four times) via the switch 7a. Note that the predetermined plural times is three or more times. This is because, there may be a chance of misdetermination due to synchronization between supplying of the electric power to the internal load heater 7 and a cycle of supplying of the electric power to the customer load if the predetermined number of times is twice. Therefore, the predetermined intervals have plural intervals. One interval among the plural intervals in the predetermined intervals is an interval other than an integral multiple of another interval. This makes it possible to inhibit at least one interval, among the plural intervals in the predetermined intervals, from synchronizing with the cycle of supplying of the electric power to the customer load. The "cycle" and "interval" of ON/OFF (operation) of the internal load heater 7 are essentially different by an operation period (duration) of the internal load heater 7. The operation period (duration) of the internal load heater 7 is much shorter (e.g., 1/5~1/20) than the operation interval of the internal load heater 7, and these are regarded as the same meaning.

In so doing, the control means 8 obtains a current electric power value just before turning ON the internal load heater 7 (calculation of electric power is shown in FIG. 3), and stores it in the volatile memory 16.

After turning ON the internal load heater 7, the current sensor installation state determiner unit 12 obtains a current electric power value (calculation of electric power is shown in FIG. 3) again, performs determination as to the installation state of the current sensor 5a, 5b, based on the obtained electric power value and the electric power value stored in the volatile memory 16, and stores a result of the determination in the nonvolatile memory 13. How the determination as to the installation state of the current sensor 5a, 5b is performed is supposed in various ways and will be described in detail later.

In a case where the distributed power supply apparatus 4 is not generating electric power or reverse power flow does not occur even in the state where the distributed power supply apparatus 4 is generating electric power, the electric power is supplied from the commercial electric power utility 1 toward the distributed power supply apparatus 4 by turning ON the internal load heater 7. Therefore, if the current sensor 5a, 5b is installed in a normal direction, a difference between two electric power values just before turning ON (actuating) the internal load heater 7 and just after turning ON the internal load heater 7 ((in the present embodiment, (difference between electric power values)=(electric power value just after turning ON the internal load heater 7)−(electric power value just before turning ON the internal load heater 7)) is positive and becomes an electric power value corresponding to a value of electric power consumption in the internal load heater 7 in ideal cases. In a case where the electric power is supplied to the customer load 2, or reverse power flow occurs, in a state where the distributed power supply apparatus 4 is generating electric power, the electric power supplied to the customer load 2 or reverse power flow is lessened, by turning ON the internal load heater 7. Therefore, if the current sensor 5a, 5b is installed in a normal direction, in the same manner, the difference between the two electric power values just before turning ON the internal load heater 7 and just after turning ON the internal load heater 7 is positive and becomes an electric power value corresponding to a value of electric power consumption in the internal load heater 7 in ideal cases.

Therefore, the current sensor installation state determiner unit 12 performs determination as to the installation state, based on the difference between the two electric power values as follows. That is, as references used for this determination, a first predetermined value which is a positive electric power value and a second predetermined value which is a negative electric power value are set as thresholds. When the difference between the two electric power values is more than the first predetermined value plural times continuously among predetermined plural times, it is determined that the installation direction is a normal direction. When the difference between the two electric power values is less than the second predetermined value plural times continuously among predetermined plural times, it is determined that the installation direction is an opposite direction. If these conditions are not satisfied, the determination control continues. In this case, furthermore, if the difference between the two electric power values is not more than the first predetermined value and is not less than the second predetermined value, it is determined that the current sensor is abnormal. That is, it is checked whether or not there is a response to the operation of the internal load heater 7, in order to prevent misdetermination that there is a failure or the like in the current sensor. Therefore, the absolute value of the first predetermined value and the absolute value of the second predetermined value are suitably set in view of a margin corresponding to an error with respect to the electric power consumption in the internal load heater 7 (e.g., set to electric power value which is about 40%~60% of the electric power consumption in the internal load heater 7) with respect to the electric power consumption in the internal load heater 7. The absolute value of the first predetermined value and the absolute value of the second predetermined value may be an equal value or different values. Of course, setting of the absolute value of the difference between the two electric power values as the threshold of the determination reference is the same as setting of the first predetermined value and the second predetermined value which are equal in absolute value.

This determination information is stored as the installation direction information in the nonvolatile memory 13.

The current sensor installation state determiner unit 12 repeats the above determination so long as these conditions are not satisfied. If these conditions are not satisfied within a predetermined time, the current sensor installation state determiner unit 12 displays information for notifying abnormality on the LCD 10. A specific example of this determination control (method) will be described in detail in Embodiment 8.

Thereafter, the electric power is calculated and corrected all the time based on the installation direction information about the current sensor 5a, 5b which is newly stored in the nonvolatile memory 13, and the electric power integration meter 9 integrates the electric power based on a result of the correction, and the LCD 10 displays the electric power.

[Method of Determination as to Installation State of Current Sensor 5a, 5b]

Now, description will be given of how the determination as to the installation state of the current sensor 5a, 5b is performed, with reference to FIGS. 11 to 15 and FIGS. 26 to 33. FIGS. 11 to 15 and FIGS. 26 to 33 each shows how the electric power value changes over time in four stages (referred to as first to fourth stages in the order from the top to the bottom). In each stage, a vertical axis indicates an electric power value and a horizontal axis indicates time. First stage indicates the electric power value of the electric power supplied to the customer load 2. Second stage indicates the electric power value of the electric power supplied to the internal load heater 7. Third stage indicates the electric power value calculated in the electric power calculator unit 11 in the case where the current sensor 5a, 5b is installed in the normal direction. Fourth stage indicates the electric power value calculated in the electric power calculator unit 11 in the case where the current sensor 5a, 5b is installed in the opposite direction.

One electric power value of the internal load heater 7 in second stage indicates the electric power value in one operation. A group of electric power values indicate one step for performing determination as to the installation state of the current sensor 5a, 5b, and each of the electric power values in one group corresponds to one determination control for the installation state of the current sensor 5a, 5b in one step. "~number of times" indicates the number of times the determination control is performed in each step. "T~" indicates an interval (cycle) (operation interval of the internal load heater 7) of the determination control.

"Solid-line arrows" in the third and fourth stages indicate that deviations of the electric power values calculated in the electric power calculator unit 11 are positive, while "broken-line arrows" in third and fourth stages indicate that deviations of the electric power values calculated in the electric power calculator unit 11 are negative. The determination that normal/opposite direction of the installation direction of the current sensor 5a, 5b matches the positive/negative sign of the deviation between the electric power values calculated in the electric power calculator unit 11 is correct determination, while the determination that normal/opposite direction of the installation direction of the current sensor 5a, 5b is the reverse of the positive/negative sign of the deviation between the electric power values calculated in the electric power calculator unit 11 is objectively regarded as misdetermination. Hereinafter, these will be referred to as the determination that normal/opposite direction of the installation direction of the current sensor 5a, 5b matches the positive/negative sign of the deviation between the electric power values (sometimes simply referred to as "match determination") or the determination that normal/opposite direction of the installation direction of the current sensor 5a, 5b is the reverse of the positive/negative sign of the deviation between the electric power values (sometimes simply referred to as "reverse determination"). In the case of "match determination", to be specific, when the current sensor 5a, 5b is installed in the normal direction, the control means 8 determines that the current sensor 5a, 5b is installed in the normal direction, while when the current sensor 5a, 5b is installed in the opposite direction, the control means 8 determines that the current sensor 5a, 5b is installed in the opposite direction. In the case of "reverse determination", to be specific, when the current sensor 5a, 5b is installed in the normal direction, the control means 8 determines that the current sensor 5a, 5b is installed in the opposite direction, while when the current sensor 5a, 5b is installed in the opposite direction, the control means 8 determines that the current sensor 5a, 5b is installed in the normal direction.

The above description applies to FIGS. 16 to 25 as described later.

COMPARATIVE EXAMPLE

Firstly, Comparative Example (Example assumed in conventional example) will be discussed. FIGS. 26 to 32 are schematic views showing determination control (determination method) in Comparative Example.

As shown in FIG. 26, for example, in a case where the customer load 2 is a laundry machine, the value of the electric power supplied to the customer load 2 changes periodically. If the cycle of the operation of the internal load heater 7 (cycle of the value of the electric power supplied to the internal load heater 7) which occurs by turning ON/OFF the switch 7a is close to the cycle of the value of the electric power supplied to the customer load 2, the problem to be solved by the present invention arises as described previously.

Figure 27:
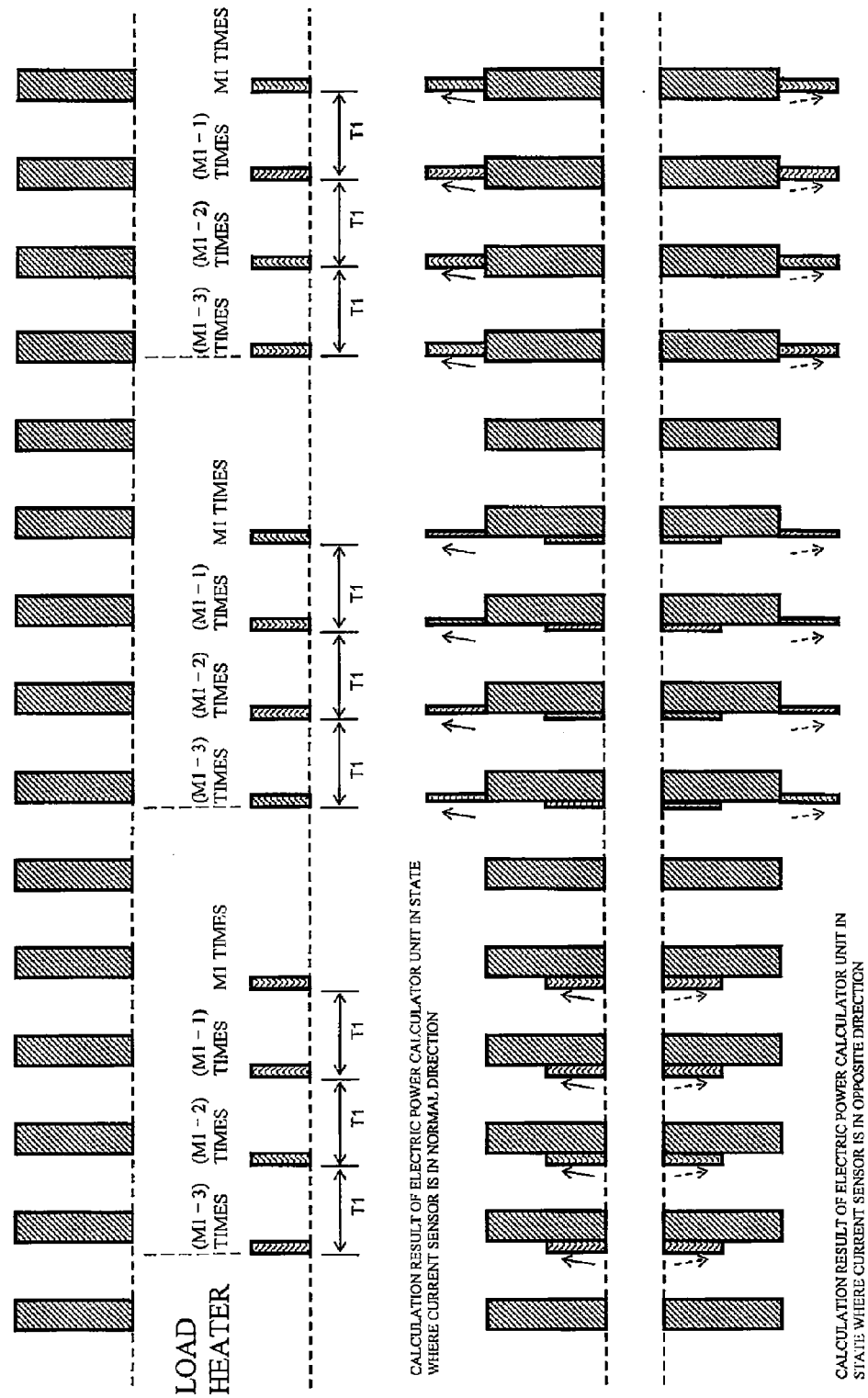
FIG. 27 is a schematic view showing determination control of Comparative Example.

To be specific, as shown in FIG. 26, there is no problem if the timing when the electric power is supplied to the internal load heater 7 and the timing when the electric power is supplied to the customer load 2 do not overlap with each other. As shown in FIG. 27, even in the case where these timings overlap with each other, there is no problem if supplying of the electric power to the internal load heater 7 is advanced with respect to supplying of the electric power to the customer load 2, or these overlap with each other completely. This is because the positive/negative (sign) of the deviation between the electric power values with which the installation state of the current sensor 5a, 5b is determined, in the above cases, is the same as the positive/negative (sign) in the case where supplying of the electric power to the internal load heater 7 and supplying of the electric power to the customer load 2 do not overlap with each other.

Figure 28:
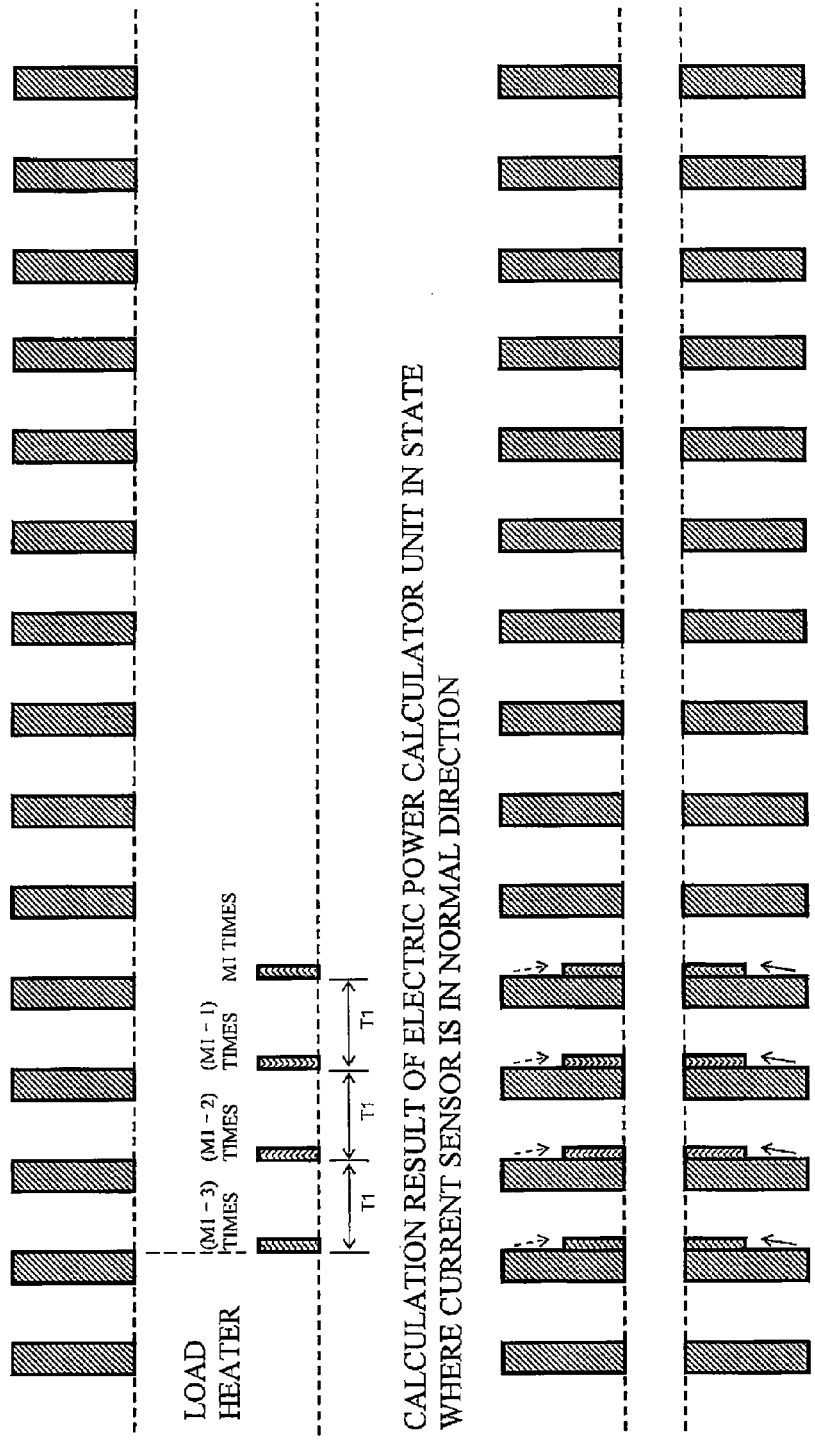
FIG. 28 is a schematic view showing determination control of Comparative Example.

On the other hand, as shown in FIG. 28, in a case where supplying of the electric power to the internal load heater 7 and supplying of the electric power to the customer load 2 partially overlap with each other in such a way that supplying of the electric power to the internal load heater 7 is delayed with respect to supplying of the electric power to the customer load 2, misdetermination occurs. For example, the deviation between the electric power values with which the installation state of the current sensor 5a, 5b is determined, is smaller with respect to the amount of electric power consumption in the internal load heater 7 and it is misdetermined that the current sensor 5a, 5b is abnormal, or the positive/negative sign of the deviation between the electric power values with which the installation state of the current sensor 5a, 5b is determined, is the reverse of the positive/negative sign of the deviation in the case where supplying of the electric power to the internal load heater 7 and supplying of the electric power to the customer load 2 do not overlap with each other. As used herein, the state where the current sensor 5a, 5b is abnormal is defined as, for example, the cases where the current sensor fails, is disconnected or is disengaged from electric cable. That is, in these examples, the deviation between the electric power values calculated in the electric power calculator unit 11 should be positive, because the internal load heater 7 is operating. Since the electric power calculator unit 11 calculates the value of electric power supplied to the customer load 2 as the electric power value just before turning ON the internal load heater 7, and calculates the value of electric power supplied to the internal load heater 7 as the electric power value just after turning ON the internal load heater 7, the deviation between the electric power values is negative.

Figure 29:
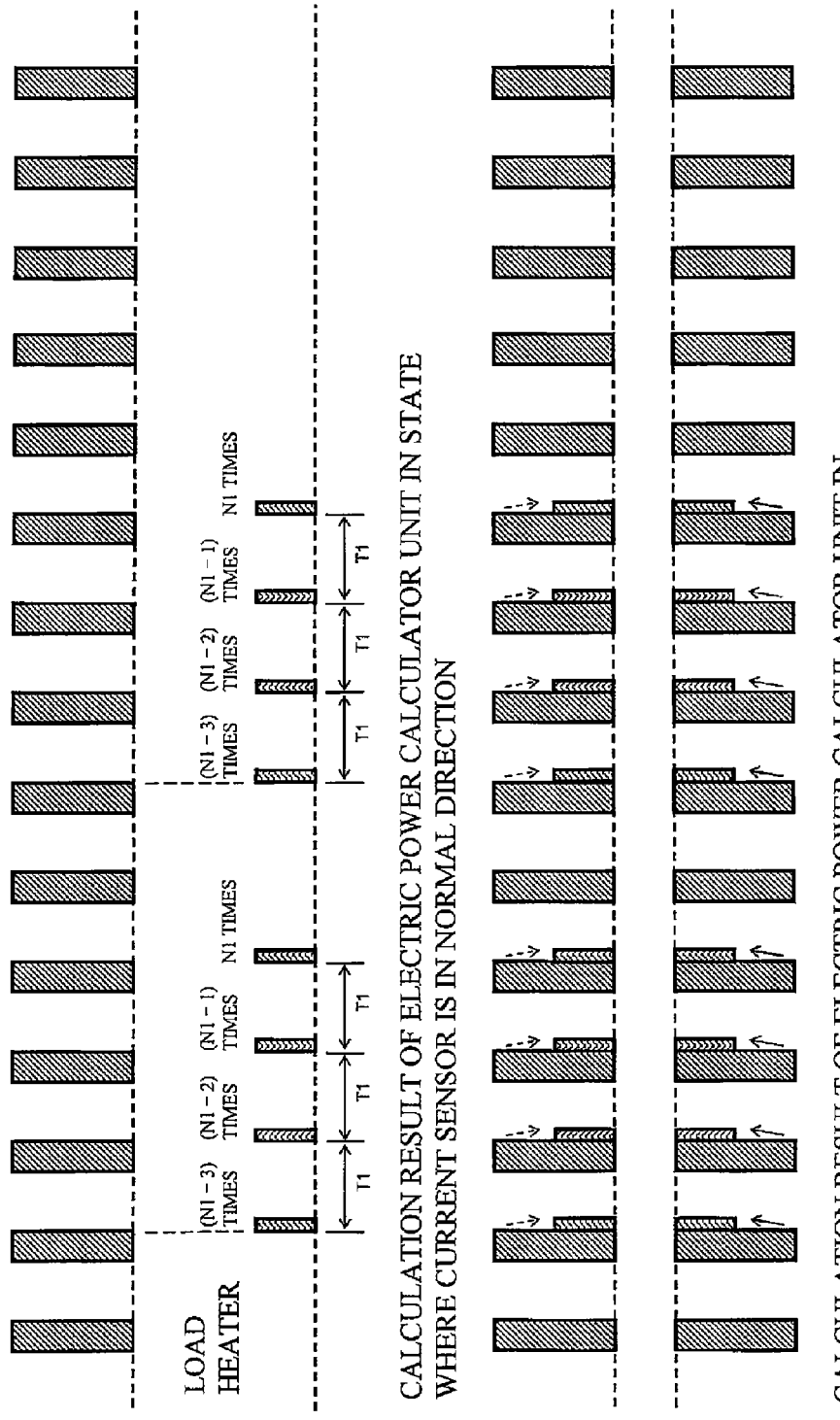
FIG. 29 is a schematic view showing determination control of Comparative Example.
Figure 30:
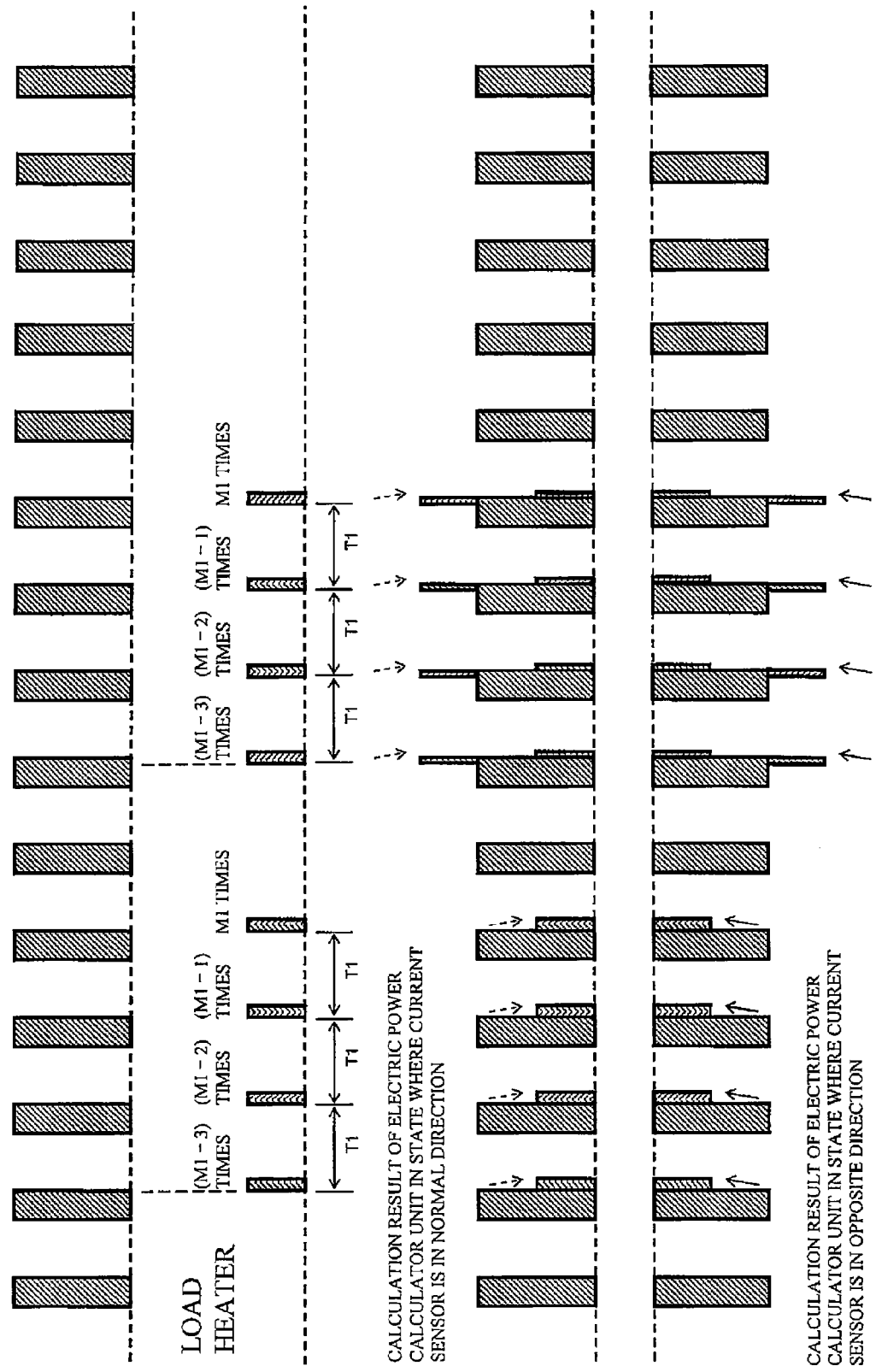
FIG. 30 is a schematic view showing determination control of Comparative Example.
Figure 31:
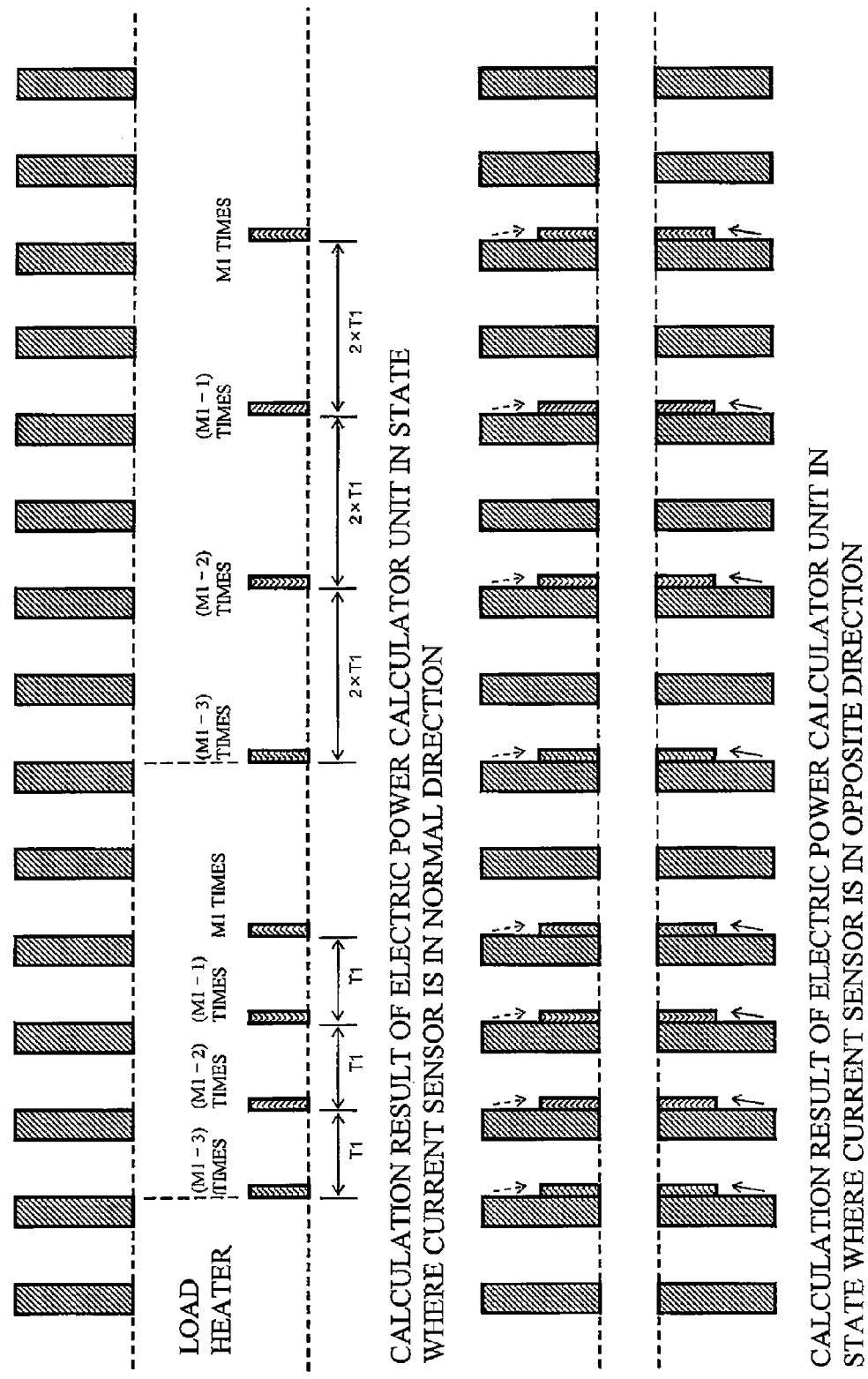
FIG. 31 is a schematic view showing determination control of Comparative Example.

In this case, as shown in FIGS. 29 and 30, misdetermination continues to occur so long as the operation interval (T1) of the internal load heater 7 is not changed. As shown in FIGS. 31 and 32, misdetermination continues to occur even when the operation interval (T1) of the internal load heater 7 is changed into an operation interval (in FIGS. 31 and 32, T1×2) which is the integral multiple of T1.

Embodiment

FIG. 33 is a schematic view showing a method of determination as to whether or not the current sensor 5a, 5b is abnormal. As shown in FIG. 33, in the present embodiment, in each determination control, when it is determined whether the current sensor 5a, 5b is installed in the normal or opposite direction, it is determined whether or not there is a response to the operation of the internal load heater 7. If it is determined that there is no response to the operation of the internal load heater 7, it is determined that the current sensor 5a, 5b is abnormal, while if it is determined that there is a response to the operation of the internal load heater 7, it is determined whether the current sensor 5a, 5b is installed in the normal or opposite direction.

Figure 33A:
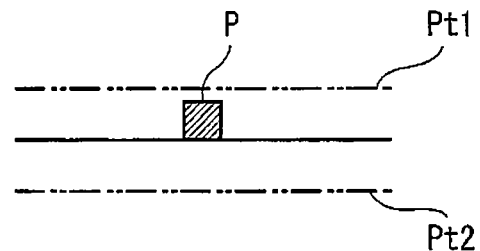
FIGS. 33A-33D are schematic views showing a method of determination as to whether or not a current sensor is abnormal.
Figure 33B:
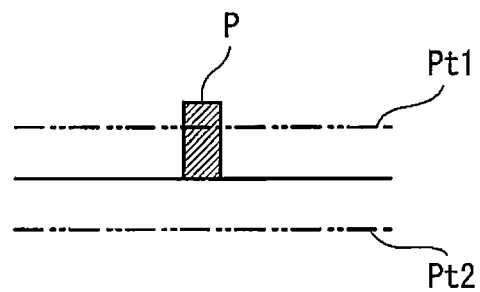
Figure 33C:
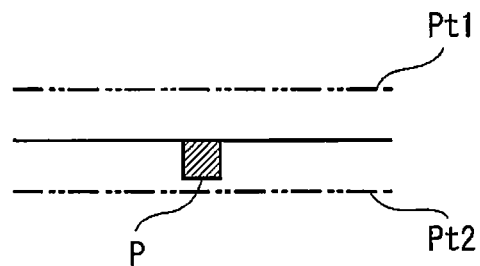
Figure 33D:
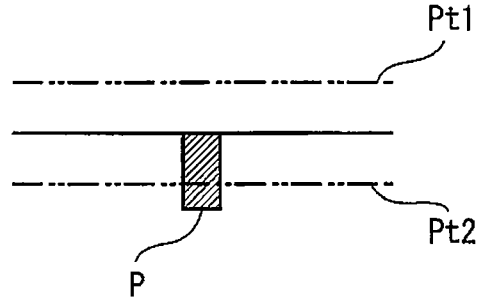

To be specific, as shown in FIG. 33A, if a deviation P between the electric power values with which the installation state of the current sensor 5a, 5b is determined, is not more than a first predetermined value Pt1, the control means 8 determines that the current sensor 5a, 5b is abnormal. As shown in FIG. 33C, if the deviation P between the electric power values is not less than a second predetermined value Pt2, the control means 8 determines that the current sensor 5a, 5b is abnormal. Thus, if it is determined that there is no response to the operation of the internal load heater 7, the control means 8 determines that the current sensor 5a, 5b is abnormal. On the other hand, as shown in FIG. 33B, if the deviation between the electric power values is more than the first predetermined value Pt1, the control means 8 determines that the current sensor 5a, 5b is installed in the normal direction. As shown in FIG. 33D, if the deviation between the electric power values is less than the second predetermined value Pt2, the control means 8 determines that the current sensor 5a, 5b is installed in the opposite direction. This makes it possible to determine that there is a response to the operation of the internal load heater 7, and to determine whether the current sensor 5a, 5b is installed in the normal or opposite direction, concurrently with each other. Therefore, in the following description (the same applies to Embodiment 2 and Embodiment 4), for the sake of brevity, comparison between the deviation between the electric power values and the first and second predetermined values Pt1 and Pt2 will not be particularly discussed. But, it is assumed that every time it is determined whether the current sensor 5a, 5b is installed in the normal or opposite direction, it is determined whether or not the current sensor 5a, 5b is abnormal, concurrently with the determination as to the installation direction. In other words, each determination control includes determination as to whether the current sensor 5a, 5b is installed in the normal or opposite direction, and determination as to whether the current sensor 5a, 5b is abnormal.

FIGS. 11 to 16 are schematic views showing exemplary determination control according to the present embodiment.

In the present embodiment, as described above, the operation (determination control) of the internal load heater 7 is performed at predetermined intervals, and one of the plural intervals in the predetermined intervals is an interval other than an integral multiple of another interval. In other words, the determination control is performed in such a manner that at least one of the plural intervals at which determination control is performed is set to an interval other than an integral multiple of another interval. This will be exemplified specifically below.

As shown in FIG. 11, in the present embodiment, at least one interval T12, among the plural intervals T11, T12, and T11 at which determination control is performed, is an interval other than an integral multiple of another intervals T11 and T11. The number of intervals may be set to two or more. The number of intervals which are other than an integral multiple of another intervals may be arbitrary, and these intervals may be continuous or discontinuous.

Figure 12:
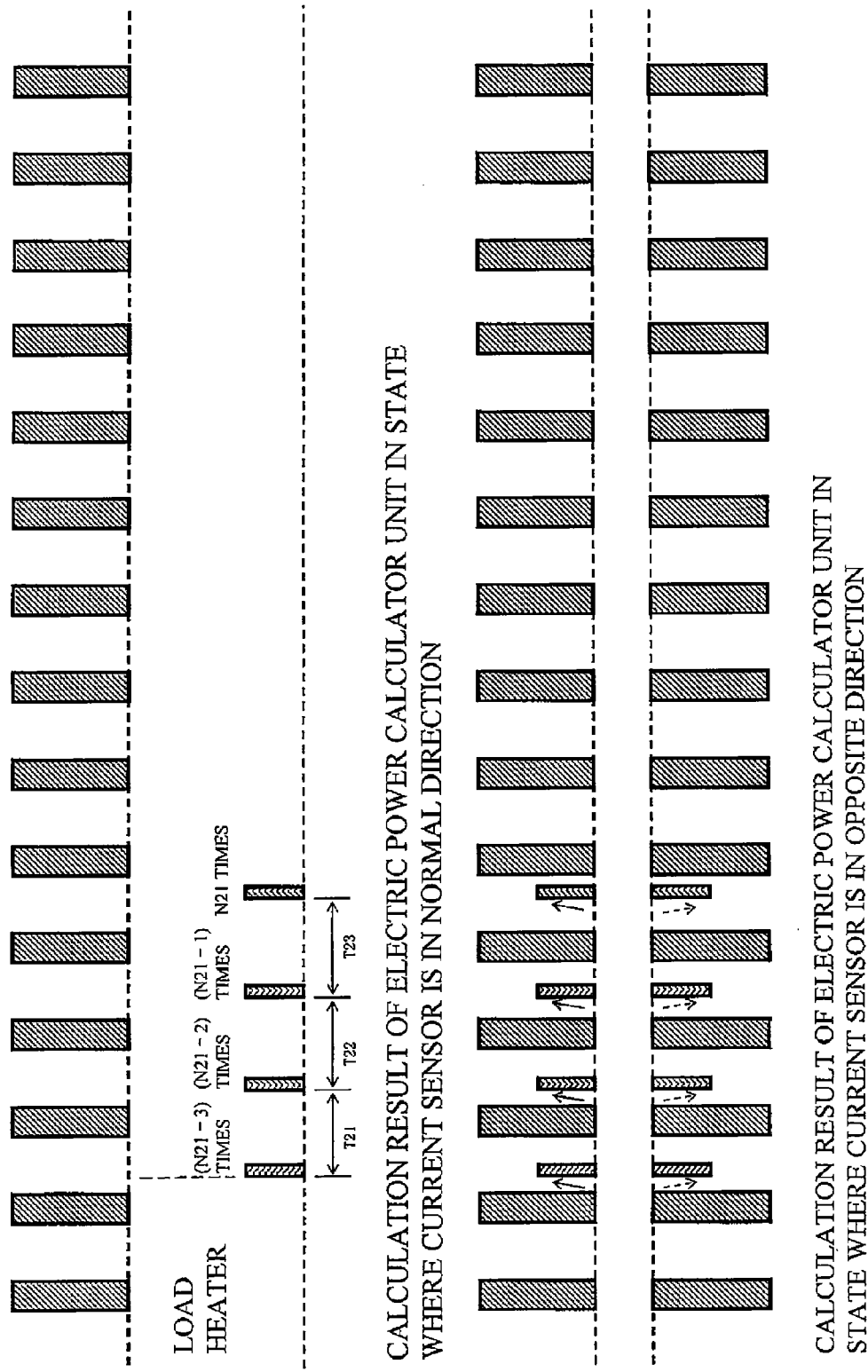
FIG. 12 is a schematic view showing exemplary determination control of Embodiment 1 of the present invention.
Figure 13:
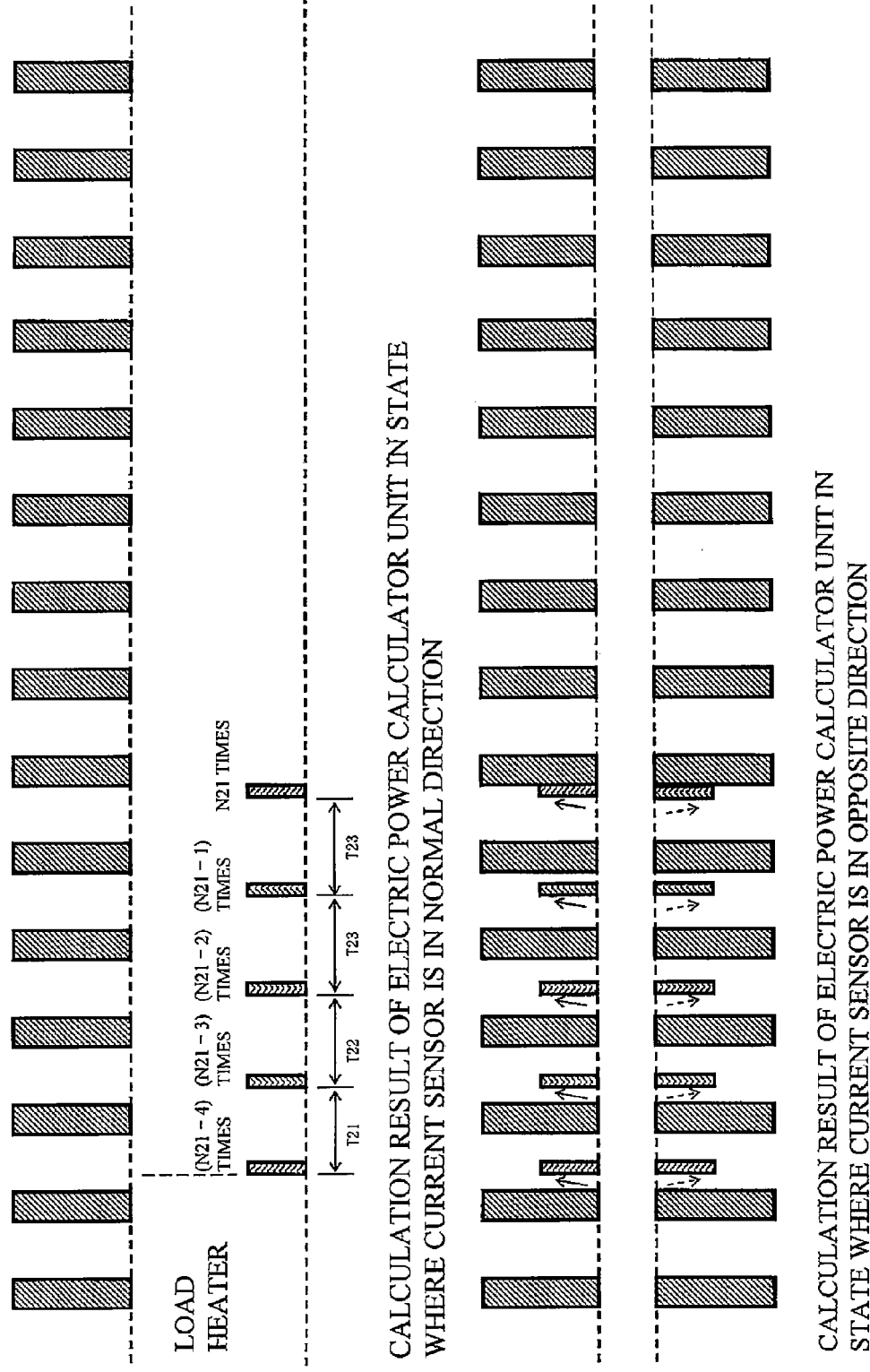
FIG. 13 is a schematic view showing exemplary determination control of Embodiment 1 of the present invention.
Figure 15:
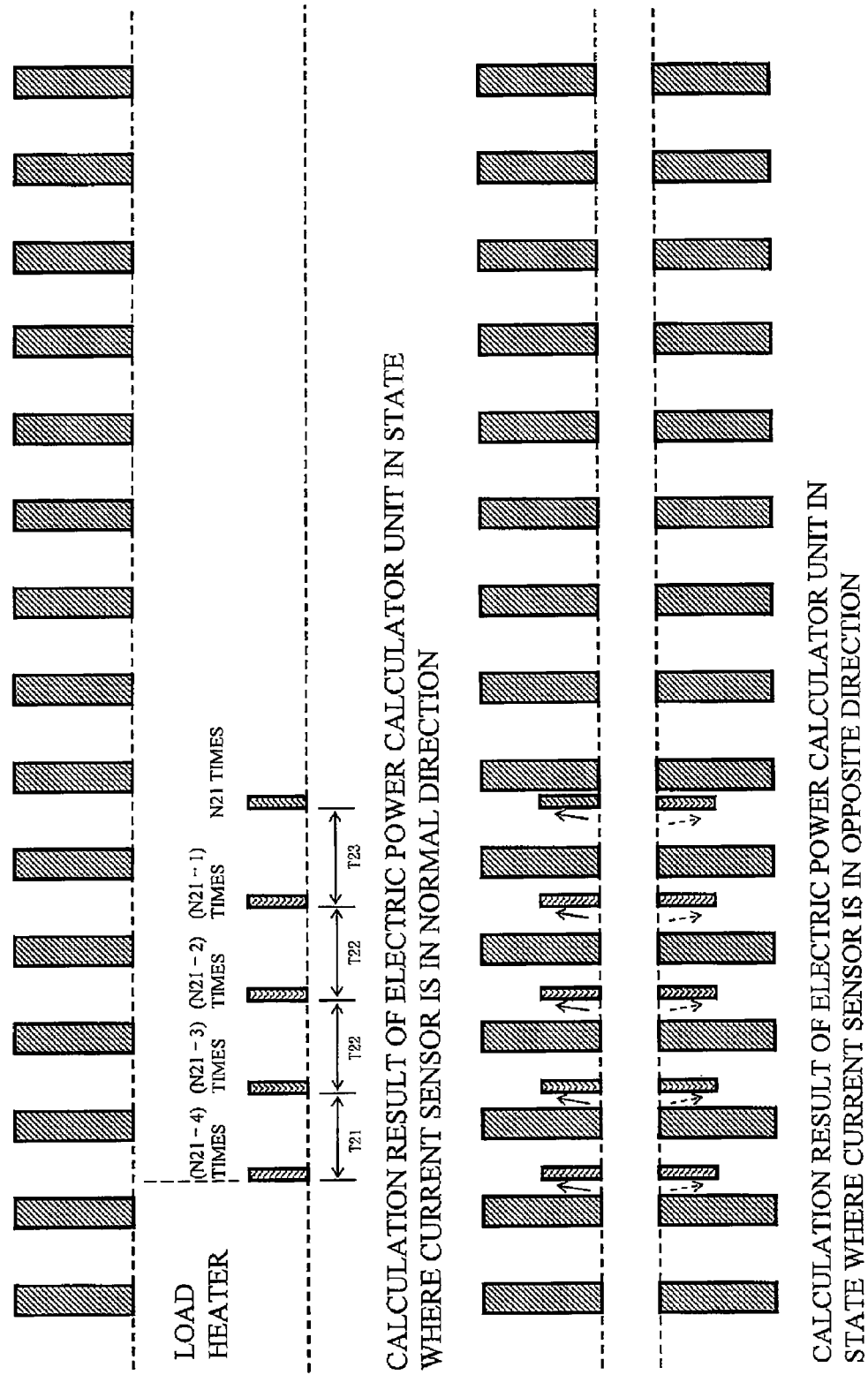
FIG. 15 is a schematic view showing exemplary determination control of Embodiment 1 of the present invention.

For example, the determination control may be performed in such a manner that the interval at which the determination control is performed, is changed plural times such that each interval is other than the integral multiple of another interval. The interval may be changed continuously or discontinuously. For example, as shown in FIG. 12, the interval may be changed continuously like the plural intervals T21, T22, and T23. For example, as shown in FIG. 13, the interval may be changed continuously like the plural intervals T21, T22, and T23, and the following interval is set equal to T23. For example, as shown in FIG. 14, the determination control may be performed in such a manner the plural intervals T21 and T21 which are constant are set, and thereafter the interval may be changed continuously like the plural intervals T22 and T23. For example, as shown in FIG. 15, the interval T21 may be changed into the interval T22, then the interval T22 may be maintained, and thereafter the interval T22 may be changed into the interval T23.

In accordance with the determination control of the present embodiment as described above, the plural intervals at which the determination control is performed always include two different intervals one of which is other than the integral multiple of the other. Even if one of the two intervals synchronizes with supplying of the electric power to the customer load 2, the other interval will not synchronize with supplying of the electric power to the customer load 2. By performing the determination control plural times as including two different intervals one of which is other than the integral multiple of the other, determination can be performed as including correct determination. Since the current sensor 5a, 5b cannot detect the current supplied to the internal load heater 7 and the current supplied to the customer load 2 in a separate manner, it is impossible to know whether or not a result of individual determination is correct. However, the probability that the interval of the determination control synchronizes with supplying of the electric power to the customer load 2 is very low. Therefore, by performing multiple times the determination control as including two different intervals one of which is other than the integral multiple of the other, the probability that misdetermination occurs continuously seems to be very low. Accordingly, in the present embodiment, in a case where the same determination result occurs plural times continuously, it is supposed that this determination result obtained plural times continuously is correct.

In all of the determination control examples shown in FIGS. 11 to 15, if the current sensor 5a, 5b is installed in the normal direction, the deviation between the electric power values calculated in the electric power calculator unit 11 is positive in the determination control of all times (in the present embodiment four times), while if the current sensor 5a, 5b is installed in the opposite direction, the deviation between the electric power values calculated in the electric power calculator unit 11 is negative in the determination control of all times. In all of the determination control examples, "determination that normal/opposite direction of the installation direction of the current sensor 5a, 5b matches the positive/negative sign of the deviation between the electric power values" ("match determination") occurs four times continuously, and therefore, the installation direction of the current sensor 5a, 5b can be determined correctly.

Figure 25:
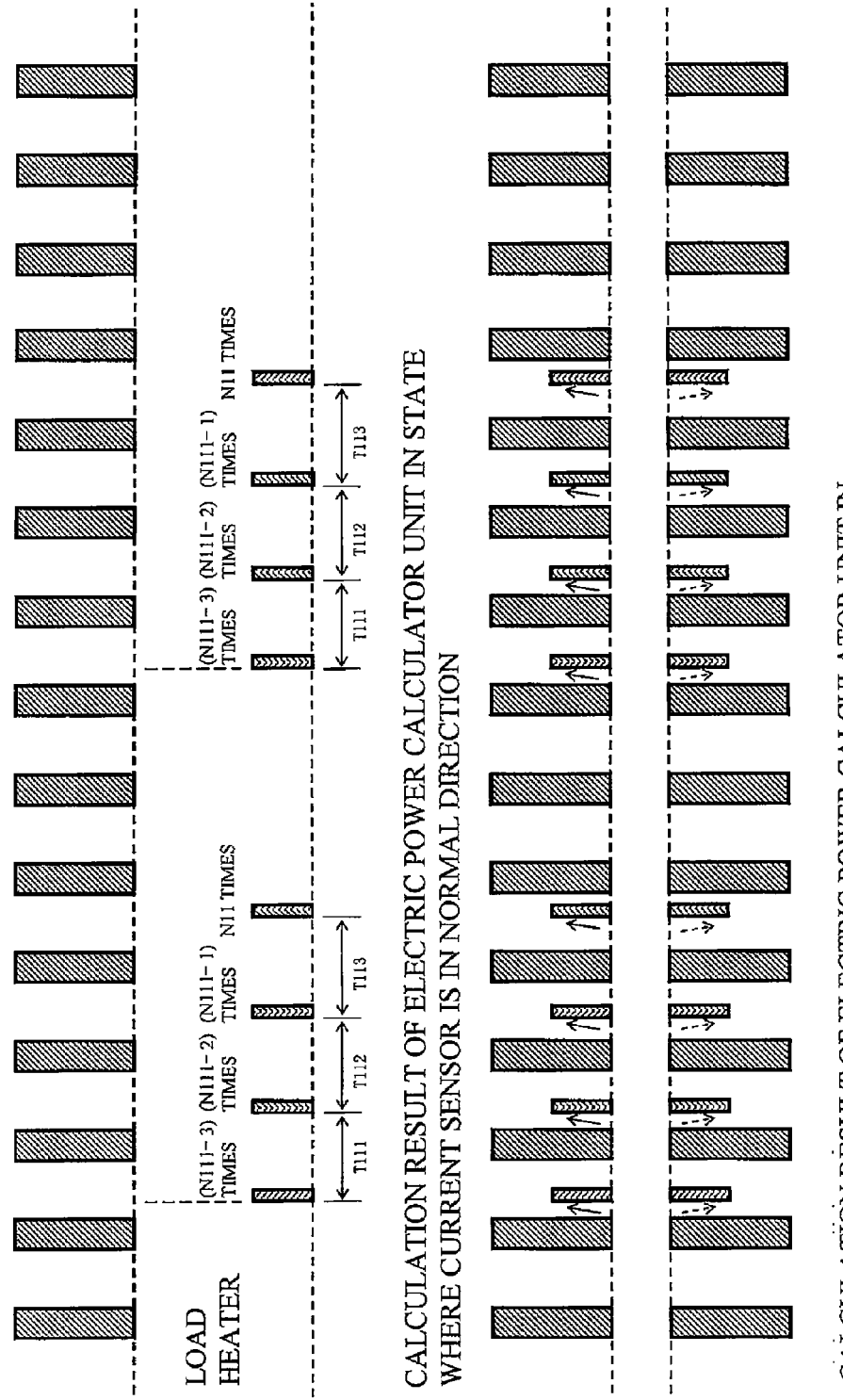
FIG. 25 is a schematic view showing exemplary determination control of Embodiment 2 of the present invention.

The control means 8 may perform the determination control plural times in such a manner that the interval at which the determination control is performed is changed continuously such that each interval is other than an integral multiple of another interval. To be specific, for example, as shown in FIG. 25, in one step, the interval at which determination control is performed may be changed continuously like the intervals T111, T112 and T113 each of which is other than the integral multiple of another interval. The number of intervals is an arbitrary number of two or more and the number of steps is an arbitrary number of two or more.

As described above, in the present embodiment, when the deviation between the electric power values calculated from products of the current values detected by the current sensor 5a, 5b and the voltage values detected by the voltage sensor 6 just before actuating the internal load heater 7 and just after actuating the internal load heater 7, is not less than the predetermined value, the control means 8 thereafter inverts the positive/negative sign of the calculated electric power value. Thus, regardless of whether or not the distributed power supply apparatus 4 is generating, the installation direction of the current sensor 5a, 5b can be determined, and the electric power value can be corrected. As a result, reliability of the system can be improved.

Embodiment 2

The block diagram of a distributed power supply system of Embodiment 2 of the present invention is similar to the block diagram of the distributed power supply system of Embodiment 1 shown in FIG. 1.

As shown in FIG. 1, the commercial electric power utility 1 which is a single-phase three-wire AC power supply composed of U-phase, O-phase and W-phase is interconnected with the customer load 2 which consumes AC power supplied from the commercial electric power utility 1.

The distributed power supply system 3 interconnected (interactively connected) to the commercial electric power utility 1 includes the distributed power supply apparatus 4 which outputs generated electric power as AC power, the customer load 2, the current sensors 5a, 5b installed in U-phase and W-phase within a distribution board installed at a point at which the distributed power supply apparatus 4 receives power from the commercial electric power utility 1 and which is upstream of the customer load 2 (in the present embodiment, current sensor 5a in U-phase and current sensor 5b in W-phase), each current sensor detecting a magnitude and positive/negative direction of a current, the voltage sensor 6 which is a voltage detection means for detecting a voltage in the commercial electric power utility 1, the internal load heater 7, the switch 7a for turning ON/OFF the internal load heater 7, the control means 8 for controlling the distributed power supply system 3, the electric power integration meter 9 for integrating an electric power value, and the LCD10 which is a display means and notification means for displaying electric power and an abnormal state of the system.

The control means 8 includes the electric power calculator unit 11 for calculating electric power for each of U-phase and W-phase based on the current value detected by the current sensor 5a, 5b and the voltage value detected by the voltage sensor 6 (in the present embodiment, a state where reverse power flow from the distributed power supply system 3 to the commercial electric power utility 1 occurs is minus), the volatile memory 16 for storing the electric power value calculated by the electric power calculator unit 11, the current sensor installation state determiner unit 12 for performing determination as to the installation state of the current sensor 5a, 5b, the nonvolatile memory 13 for storing a result of determination performed by the current sensor installation state determiner unit 12, the sign inverting unit 14 for correcting the positive/negative sign of the electric power value calculated in the electric power calculator unit 11 based on information about the installation direction of the current sensor 5a, 5b which is stored in the nonvolatile memory 13, and the internal load heater control unit 15 for controlling feeding of electric power to the internal load heater 7 via the switch 7a.

Figure 4:
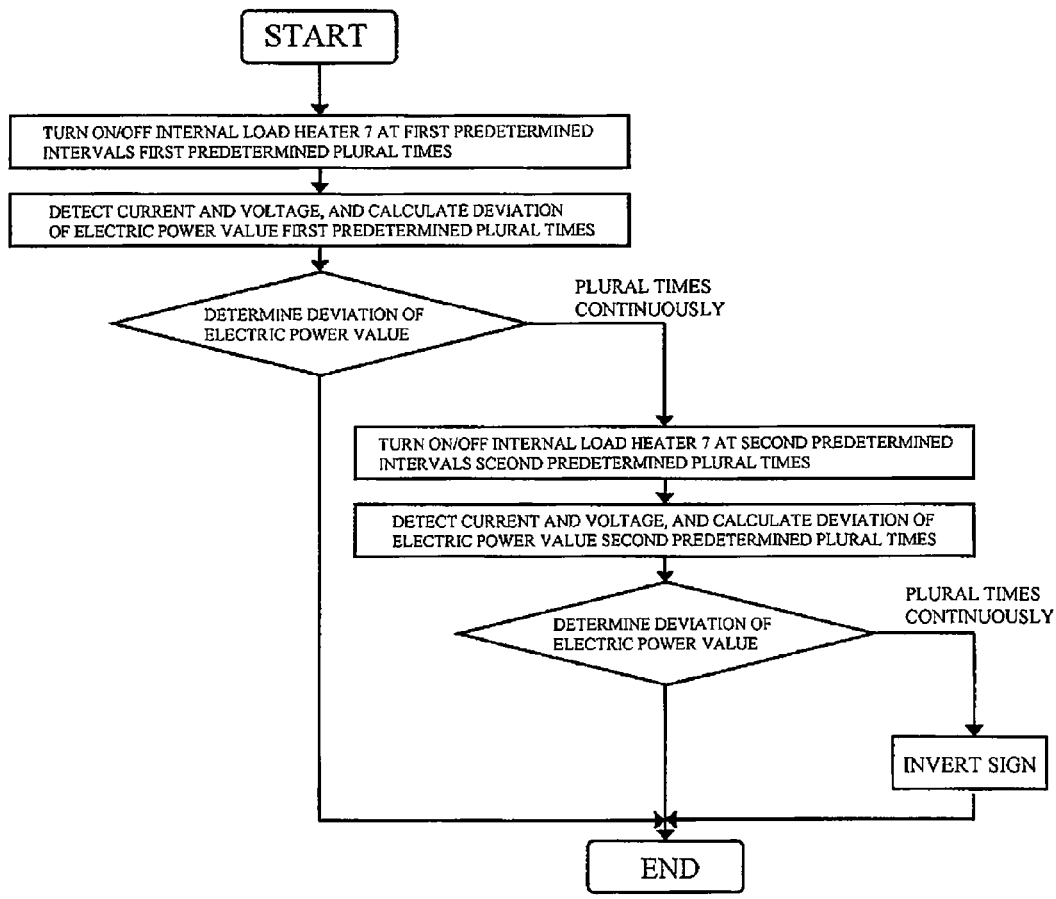
FIG. 4 is a flowchart showing a flow of determination as to the installation state of current sensor in a distributed power supply system of Embodiment 2.

FIG. 4 is a flowchart showing a flow of determination as to the installation state of the current sensor in the distributed power supply system of Embodiment 2. FIG. 3 is a flowchart showing a flow of calculation and correction of electric power in the distributed power supply system of Embodiment 2.

The operation and function of the distributed power supply system configured as described above will be described with reference to FIGS. 1, 4, and 3.

The control means 8 performs determination as to the installation state of the current sensor 5a, 5b when power is ON. After performing determination as to the installation state of the current sensor 5a, 5b, electric power is calculated and corrected all the time and determination as to the installation state of the current sensor 5a, 5b is performed on a regular basis to address situations where the installation direction of the current sensor 5a, 5b is changed by a person, and where the current sensor 5a, 5b fails, is disconnected or disengaged from electric cable.

Hereinafter, description will be given of a determination method (determination control) of the installation state of the current sensor 5a, 5b.

The control means 8 causes the internal load heater control unit 15 to actuate the internal load via the switch 7a at first predetermined intervals first predetermined plural times, in a first step, and then causes the internal load heater control unit 15 to turn ON/OFF the internal load at second predetermined intervals second predetermined plural times in a second step.

In so doing, the control means 8 obtains a current electric power value (calculation of electric power is shown in FIG. 3) just before turning ON the internal load heater 7 and stores it in the volatile memory 16.

After turning ON the internal load heater 7, the current sensor installation state determiner unit 12 obtains a current electric power value (calculation of electric power is shown in FIG. 3) again, performs determination as to the installation state of the current sensor 5a, 5b, based on the obtained electric power value and the electric power value stored in the volatile memory 16, and stores a result of the determination in the nonvolatile memory 13.

In a case where the distributed power supply apparatus 4 is not generating electric power or reverse power flow does not occur even in the state where the distributed power supply apparatus 4 is generating electric power, the electric power is supplied from the commercial electric power utility 1 toward the distributed power supply apparatus 4 by turning ON the internal load heater 7. Therefore, if the current sensor 5a, 5b is installed in a normal direction, a difference between two electric power values just before turning ON the internal load heater 7 and just after turning ON the internal load heater 7 ((in the present embodiment, (difference between electric power values)=(electric power value just after turning ON the internal load heater 7)−(electric power value just before turning ON the internal load heater 7)) is positive and becomes an electric power value corresponding to a value of electric power consumption in the internal load heater 7 in ideal cases. In a case where electric power is supplied to the customer load 2, or reverse power flow occurs, in a state where the distributed power supply apparatus 4 is generating electric power, the electric power supplied to the customer load 2 or electric power of reverse power flow is lessened, by turning ON the internal load heater 7. Therefore, if the current sensor 5a, 5b is installed in a normal direction, in the same manner, the difference between the electric power values just before turning ON the internal load heater 7 and just after turning ON the internal load heater 7 is positive and becomes an electric power value corresponding to a value of electric power consumption in the internal load heater 7 in ideal cases.

Therefore, the current sensor installation state determiner unit 12 performs determination as to the installation state based on the difference between the two electric power values and the first and second predetermined values as described in Embodiment 1. It is determined whether or not the difference between the two electric power values is more than the first predetermined value plural times continuously among first predetermined plural times in the first step. It is determined whether or not the difference between the two electric power values is more than the first predetermined value plural times continuously among second predetermined plural times in the second step. If it is determined the difference value is more than the first predetermined value plural times continuously in the first step and in the second step, it is determined that the current sensor 5a, 5b is installed in the positive direction. In addition, it is determined whether or not the difference between the two electric power values is less than the second predetermined value plural times continuously among first predetermined plural times in the first step. It is determined whether or not the difference between the two electric power values is less than the second predetermined value plural times continuously among second predetermined plural times in the second step. If it is determined the difference value is less than the second predetermined value plural times continuously in the first step and in the second step, it is determined that the current sensor 5a, 5b is installed in the negative direction. Further, it is determined whether or not the difference value between the two electric power values is not more than the first predetermined value and not less than the second predetermined value plural times continuously among first predetermined plural times in the first step, and it is determined whether or not the difference value between the two electric power values is not more than the first predetermined value and not less than the second predetermined value plural times continuously among second predetermined plural times in the second step. If it is determined that the difference value is not more than the first predetermined value and not less than the second predetermined value plural times continuously in the first step and in the second step, it is determined that the current sensor is abnormal, and information is stored in the nonvolatile memory 13 as the installation direction information.

The current sensor installation state determiner unit 12 repeats the first step and the second step so long as these conditions are not satisfied. If these conditions are not satisfied within a predetermined time, the current sensor installation state determiner unit 12 displays information for notifying abnormality on the LCD 10. Specific example of the determination control (determination method) will be described in detail in Embodiment 8.

Thereafter, the electric power is calculated and corrected all the time based on the installation direction information of the current sensor 5a, 5b which is newly stored in the nonvolatile memory 13, and the electric power integration meter 9 integrates the electric power based on a result of the correction, and the LCD 10 displays the electric power.

[Method of Determination as to Installation State of Current Sensor 5a, 5b]

FIGS. 16 to 25 are schematic views showing exemplary determination control of the present embodiment. The description of these Figures is the same as that of FIGS. 11 to 15 and FIGS. 26 to 32 in Embodiment 1 and will be omitted. The above "first predetermined interval" is hereinafter referred to as "first interval", and the above "second predetermined interval" is hereinafter referred to as "second interval."

In the present embodiment, the determination as to the installation state of the current sensor 5a, 5b is carried out by any one of methods described below or by a suitable combination of them (combination including methods which do not exclude each other). Although in the following description, for the sake of brevity, comparison between the deviation between the electric power values and the first and second predetermined values Pt1 and Pt2 will not be particularly discussed, it is assumed that every time it is determined whether the current sensor 5a, 5b is installed in the normal or opposite direction, it is determined whether or not the current sensor 5a, 5b is abnormal, concurrently with the determination as to the installation direction of the current sensor 5a, 5b. In other words, each determination control includes determination as to whether the current sensor 5a, 5b is installed in the normal or opposite direction, and determination as to whether the current sensor 5a, 5b is abnormal.

<Method 1>

In method 1, the control means 8 executes the first step of performing determination control of the installation state of the current sensor 5a, 5b at the first intervals plural times, and the second step of performing determination control of the installation state of the current sensor 5a, 5b at the second intervals plural times, decides a result of the determination as to the installation state of the current sensor 5a, 5b as each step based on the determination control executed plural times in each step, for each step, and executes the second step in such a manner that at least one of the second intervals is set to an interval other than an integral multiple of the first interval. That is, the plural intervals in the first step are predetermined, the plural intervals in the second step are predetermined, and these intervals are different from each other between the first step and the second step such that the interval in the second step is other than an integral multiple of the interval in the first step. Which of the first step and the second step is performed firstly may be arbitrary. The number of times the determination control is performed may be different between the first step and the second step. The number of times of the first step, the number of times of the second step, and the order of the first step and the second step may be arbitrary.

Figure 16:
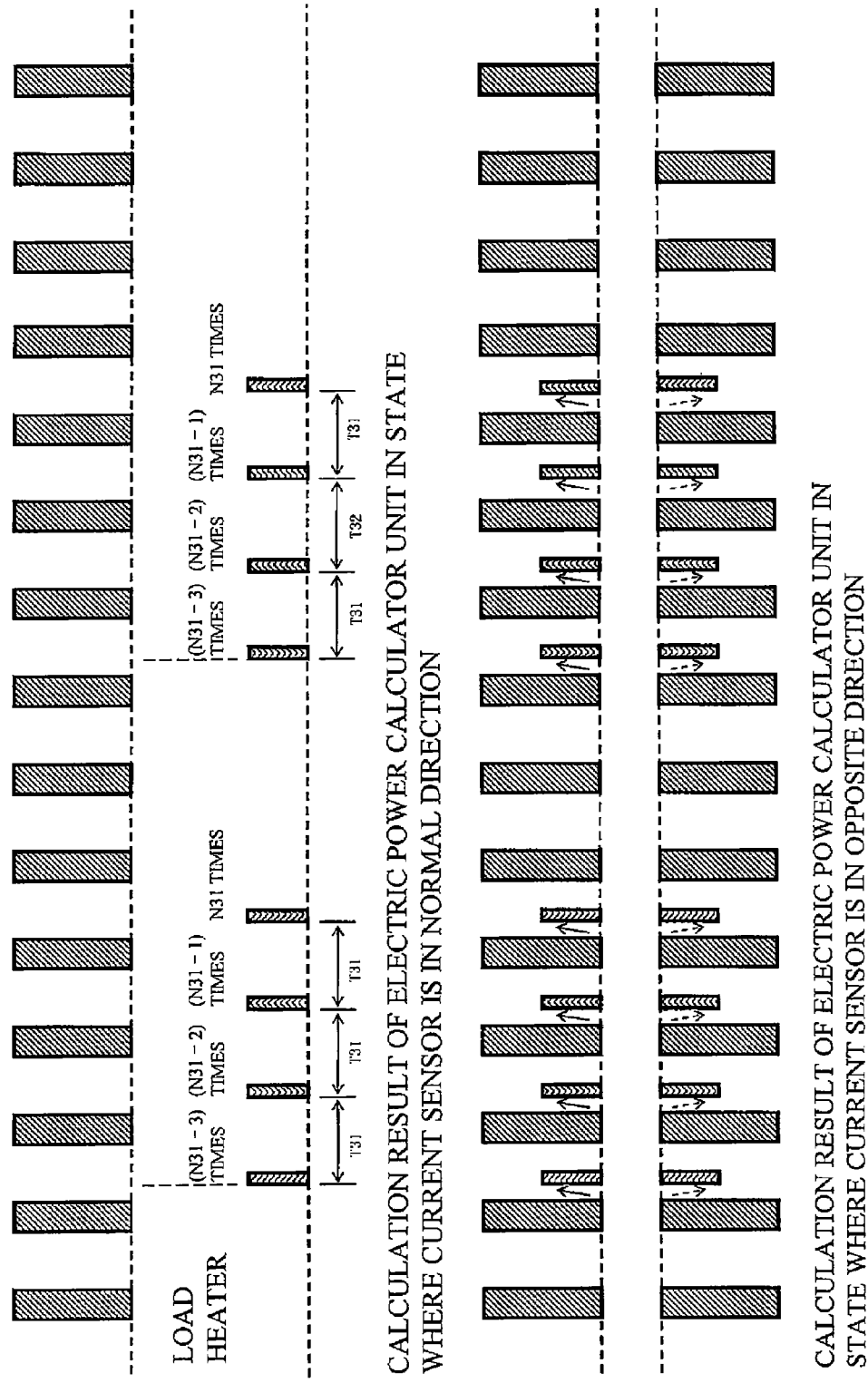
FIG. 16 is a schematic view showing exemplary determination control of Embodiment 1 of the present invention.
Figure 17:
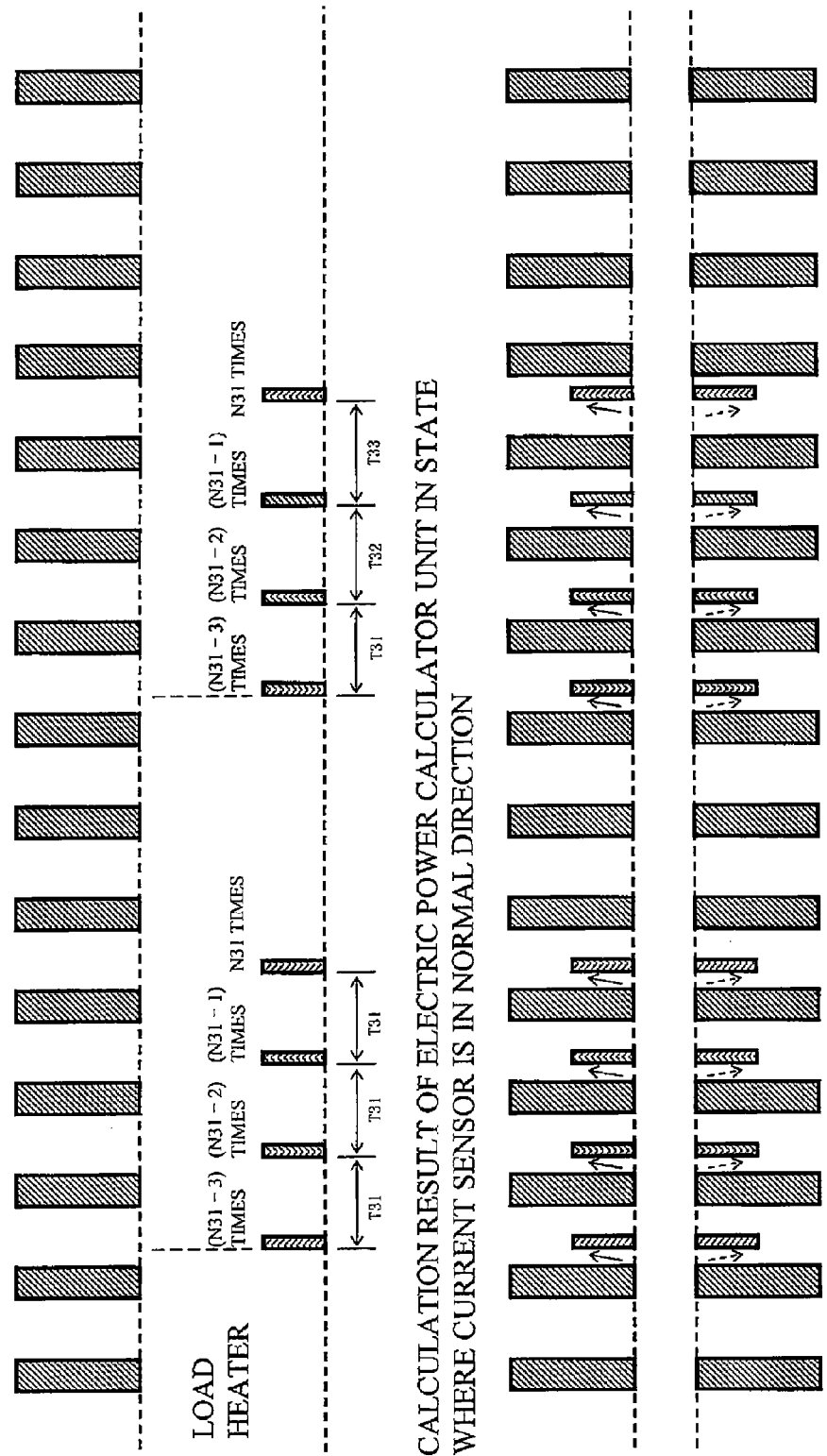
FIG. 17 is a schematic view showing exemplary determination control of Embodiment 2 of the present invention.

To be specific, for example, as shown in FIG. 16, the first intervals in the first step may be constant T31, while one of the second intervals in the second step may be T32 which is different from the first interval T31 and is other than an integral multiple of the first interval T31, and the other intervals of the second intervals may be the first intervals T31. For example, as shown in FIG. 17, the first intervals in the first step may be constant T31, while two of the second intervals in the second step may be T32 and T33 which are different from the first interval T31 and are other than an integral multiple of the first interval T31, and the other interval of the second intervals may be T31 which is the same as the first interval T31.

In the present method, it is possible to prevent misdetermination which would occur when one interval at which the determination control is performed is the integral multiple of another interval. In addition, since the step of determining the installation state of the current sensor 5*a*, 5*b* is carried out twice, the determination can be performed more surely.

<Method 2>

Figure 18:
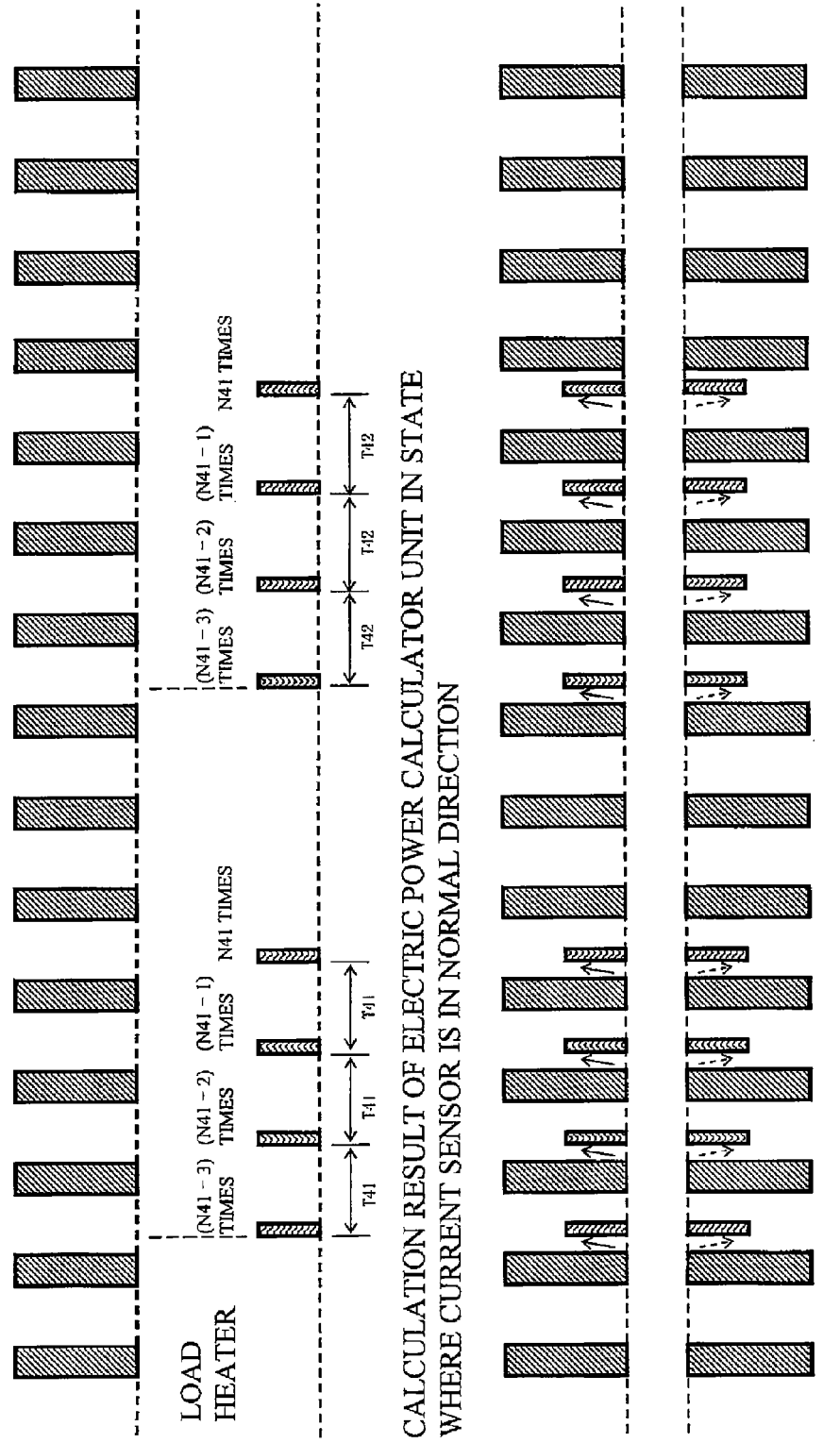
FIG. 18 is a schematic view showing exemplary determination control of Embodiment 2 of the present invention.

In method 2, the control means 8 performs the second step such that all of the second intervals are equal in method 1. To be specific, for example, as shown in FIG. 18, all of the first intervals in the first step may be constant T41, while all of the second intervals in the second step may be constant T42.

With the present method, the determination control is simplified.

<Method 3>

In method 3, in method 1 or 2, the control means 8 carries out the first and second steps until results of determination as respective steps which are decided in the steps of last plural times become the same.

Specific examples will be explained using determination control examples of FIGS. 19, 20A and 20B corresponding to method 1 and determination control examples of FIGS. 21 and 22 corresponding to method 2.

Figure 19:
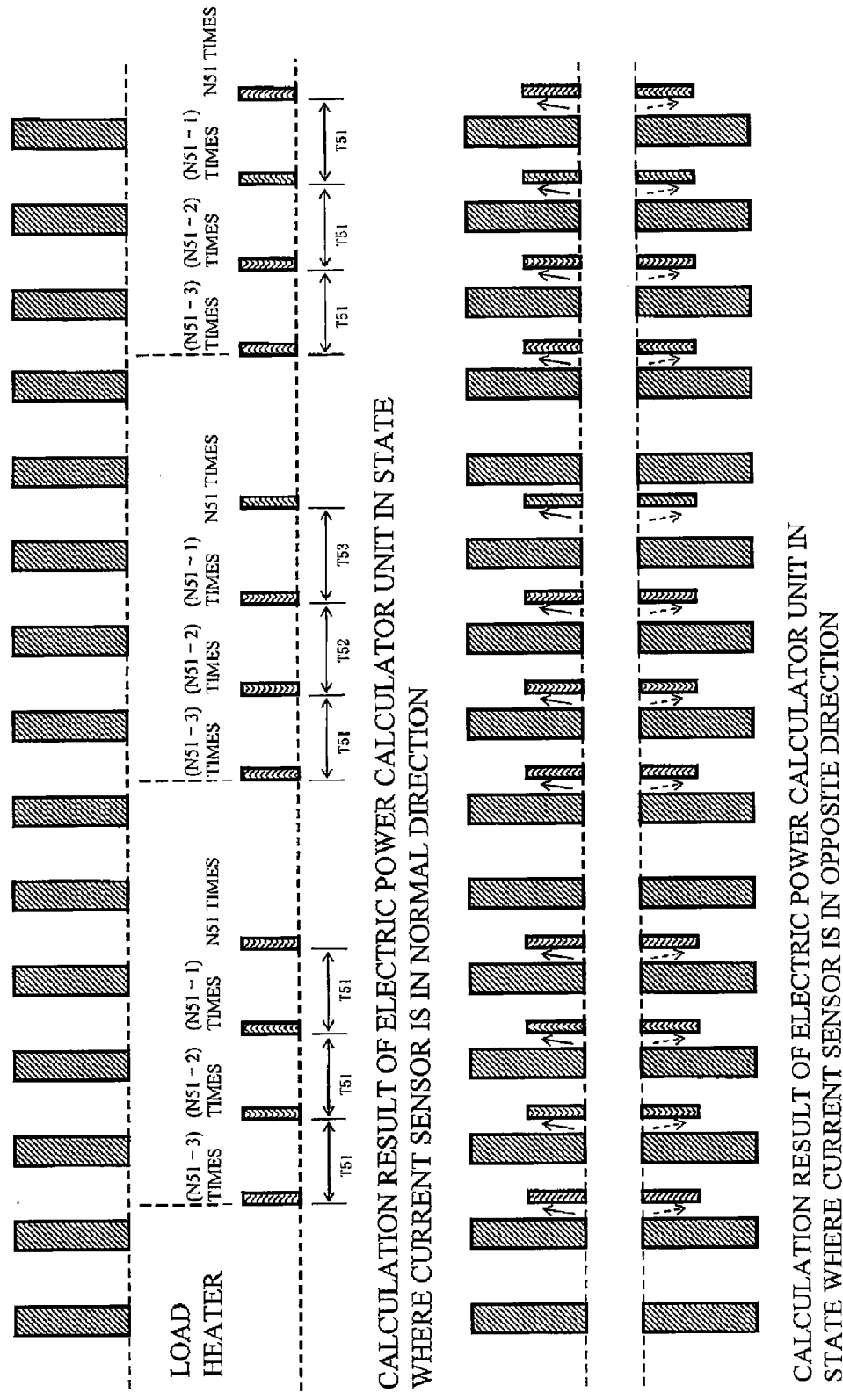
FIG. 19 is a schematic view showing exemplary determination control of Embodiment 2 of the present invention.

Firstly, like the determination control example of FIG. 19, it is assumed that supplying of the electric power to the internal load heater 7 does not synchronize with supplying of the electric power to the customer load 2, in both of the first and second steps. In this case, in the first step at first time, "determination that the normal/opposite direction of the installation of the current sensor 5*a*, 5*b* matches the positive/negative sign of the deviation between the electric power values" ("match determination") occurs four times continuously. Therefore, the result of determination as the first step is "match determination." In the second step and in the first step at second time, "match determination" occurs four times continuously. Therefore, the result of determination as the second step and the result of determination as the first step at second time are each "match determination." For example, if "last plural times" is defined as "last two times", the control means 8 terminates the determination control at this point of time. Alternatively, a third step may be further performed. If the third step is performed, it is necessary that results of determination (in the present embodiment, "match determination") as respective steps, in the second step and the first step at second time, which are last two times, be the same. For example, if the term "last plural times" is defined as "last three times", the control means 8 terminates the determination control at the time point when the first step at second time terminates. In the same manner, "last plural times" may be set to four times or more times. As "last plural times" increases in number, accuracy of determination improves, but a time taken to attain a last determination result increases.

Figure 20A:
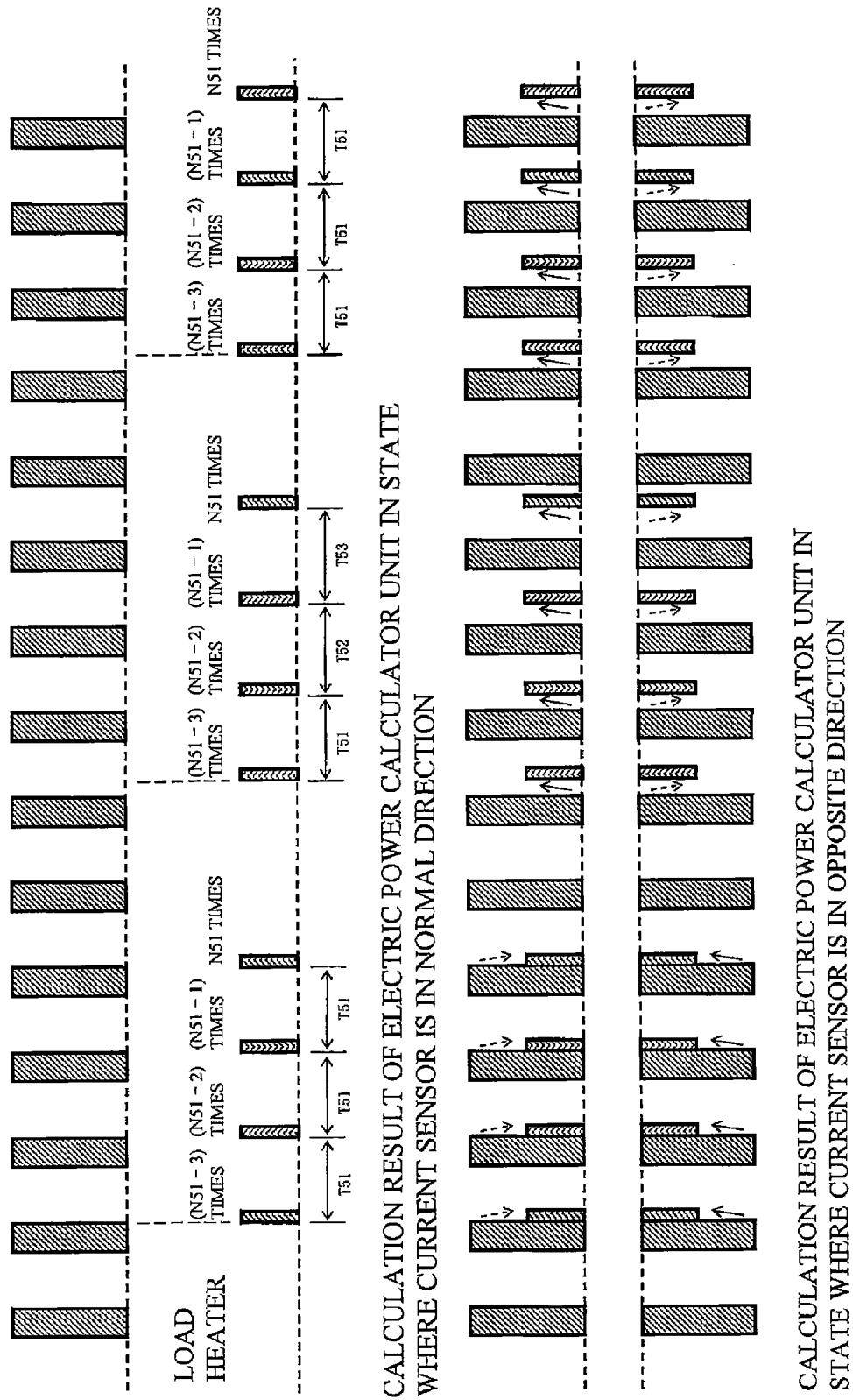
FIG. 20A is a schematic view showing exemplary determination control of Embodiment 2 of the present invention.
Figure 20B:
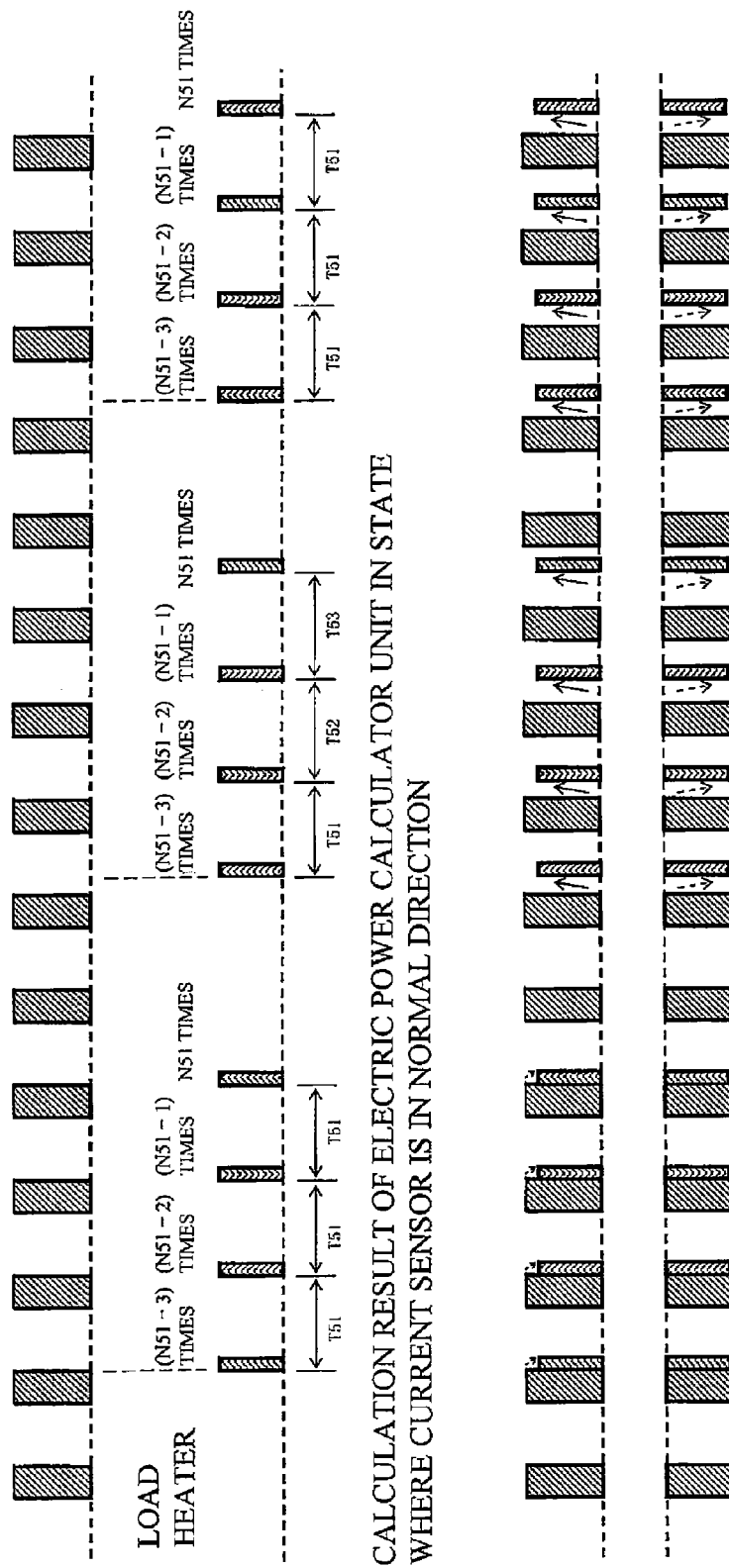
FIG. 20B is a schematic view showing exemplary determination control of Embodiment 2 of the present invention.

Like the determination control examples shown in FIGS. 20A and 20B, it is supposed that supplying of the electric power to the internal load heater 7 synchronizes with supplying of the electric power to the customer load 2, in the first step. It is supposed that "last plural times" is "last two times." In the determination control example of FIG. 20A, in the first step at first time, "determination that the normal/opposite direction of the installation of the current sensor 5*a*, 5*b* is the reverse of the positive/negative sign of the deviation between the electric power values" ("reverse determination") occurs four times continuously. Therefore, the result of determination as the first step is "reverse determination." On the other hand, in the second step, part of the intervals of determination control, i.e., intervals T52 and T53 are different from an interval T51 of determination control in the first step, and "match determination" occurs four times continuously. Therefore, result of determination as the second step is "match determination." So, the results of determination as respective steps which are decided in the steps of "last two times" are different from each other. Therefore, the controller 8 executes the first step at second time. In this case, if lack of synchronization occurs between supplying of the electric power to the internal load heater 7 and supplying of the electric power to the customer load 2, then this state is more likely to continue. Therefore, in the first step at second time, "match determination" occurs four times continuously. As a result, results of determination as respective steps which are decided in steps of "last two times" are the same, and the control means 8 terminates the determination control. In this case, final determination is "match determination."

FIG. 20B shows a case where it is determined that the current sensor 5*a*, 5*b* is abnormal in the first step. In the determination control example of FIG. 20B, the deviation between the electric power values is not more than the first predetermined value and not less than the second predetermined value, which occurs four times continuously in the first step at first time, and "determination that the current sensor 5*a*, 5*b* is abnormal" is obtained. Therefore, the result of determination as the first step is "determination that the current sensor 5*a*, 5*b* is abnormal." On the other hand, in the second step, part of the intervals of determination control, i.e., intervals T52 and T53 are different from the interval T51 of determination control in the first step, and "match determination" occurs four times continuously. Therefore, result of determination as the second step is "match determination." So, the results of determination as respective steps which are decided in the steps of "last two times" are different from each other. Therefore, the controller 8 executes the first step at second time. In this case, if lack of synchronization occurs between supplying of the electric power to the internal load heater 7 and supplying of the electric power to the customer load 2, then this state is more likely to continue. Therefore, in the first step at second time, "match determination" occurs four times continuously. As a result, results of determination as respective steps which are decided in the steps of "last two times" are the same, and the control means 8 terminates the determination control. In this case, final determination is "match determination."

Figure 21:
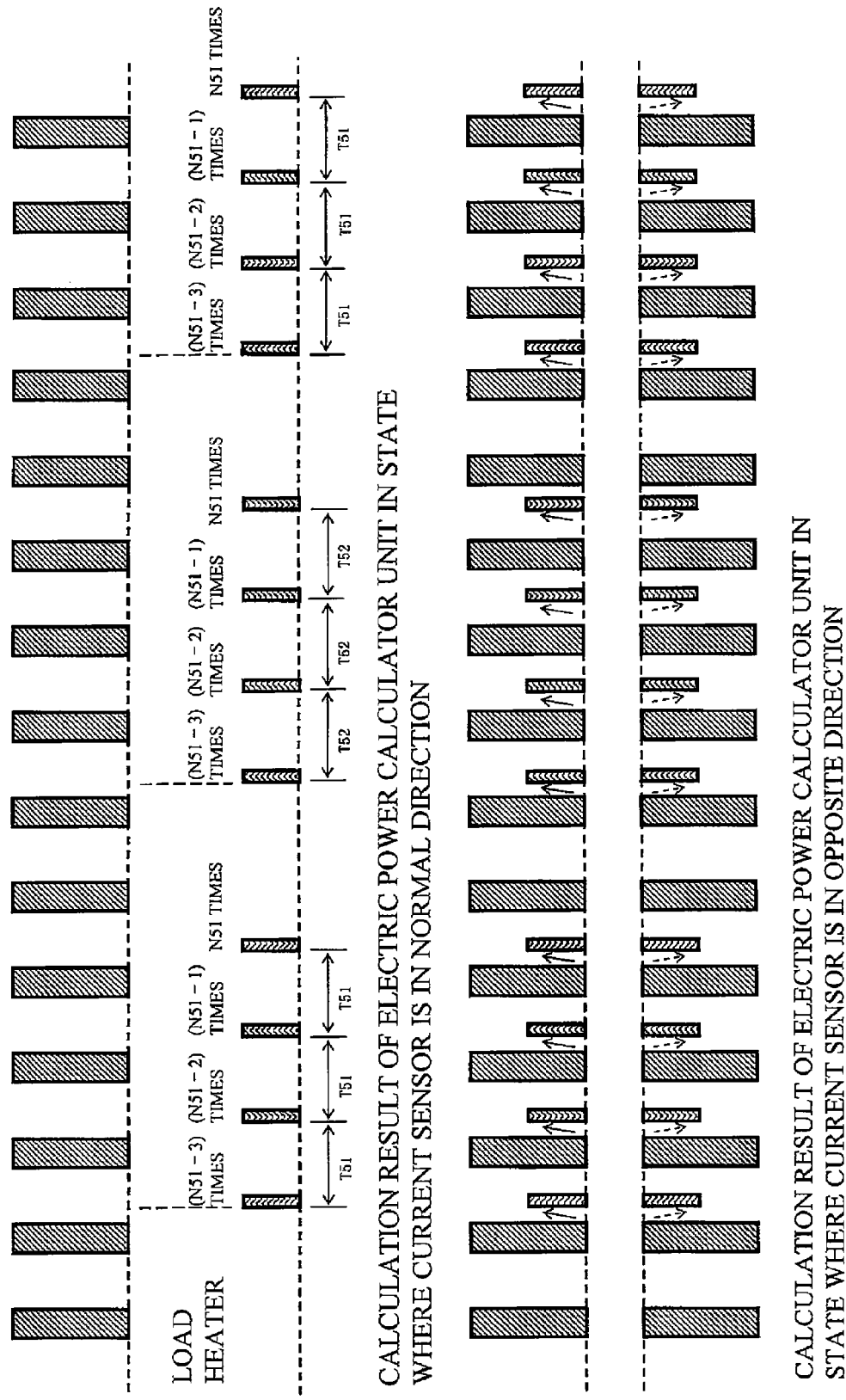
FIG. 21 is a schematic view showing exemplary determination control of Embodiment 2 of the present invention.
Figure 22:
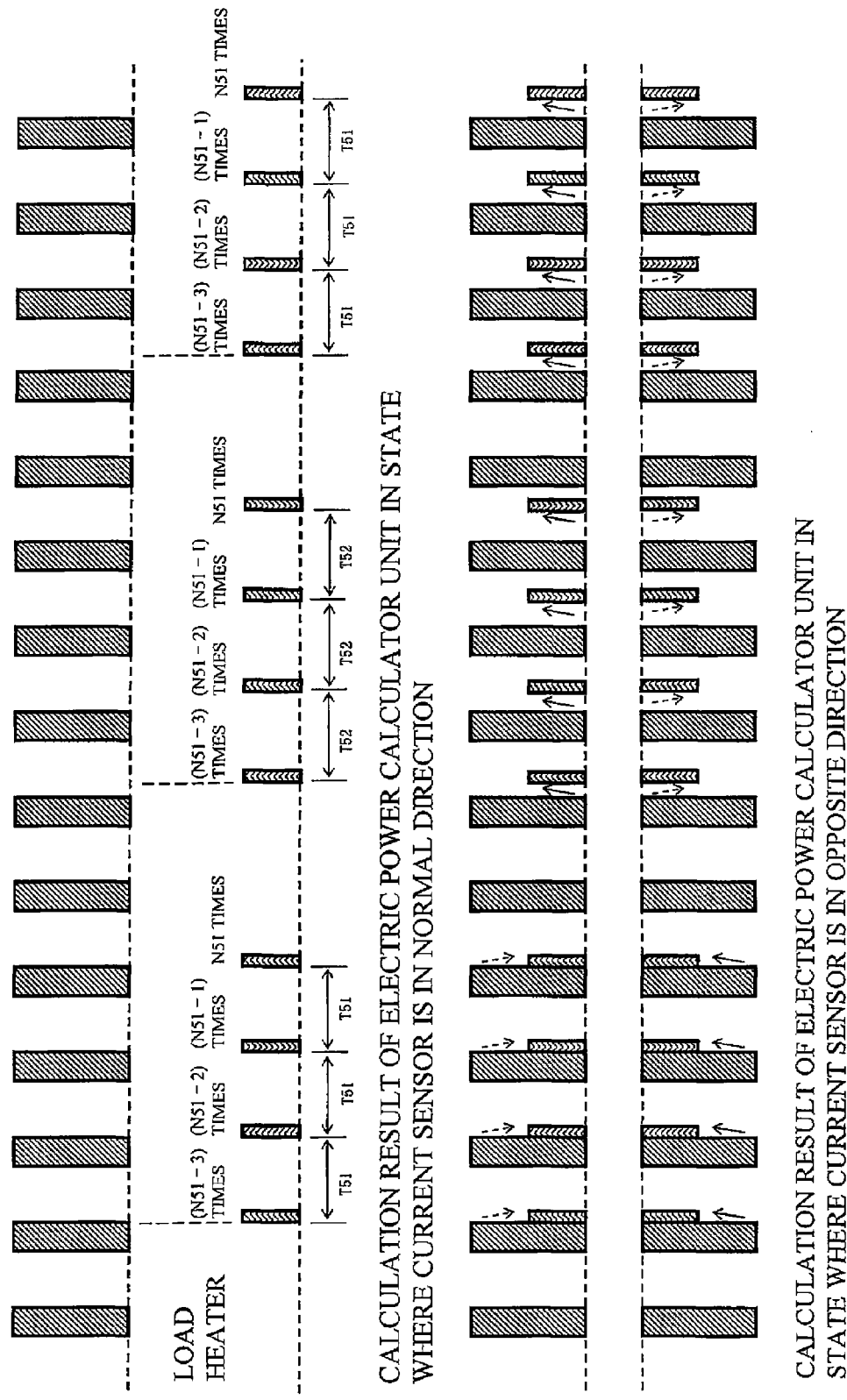
FIG. 22 is a schematic view showing exemplary determination control of Embodiment 2 of the present invention.

The determination control examples of FIGS. 21 and 22 are identical to the determination control examples of FIGS. 19, 20A, and 20B except that the first and second steps correspond to those of method 2, and will not be described repetitively.

With the present method, the installation state of the current sensor can be determined more surely.

<Method 4>

In method 4, the control means 8 executes the first step and the second step until results of determination as respective steps which are decided in the respective steps become the same a specified number times or more times, in method 1 or method 2.

This specific example will be described using the determination control example of FIG. 23. In the determination control example of FIG. 23, the first and second steps correspond to those of method 1, respectively. The same applies to a case where the first and second steps correspond to those of method 2, respectively, which will not be described repetitively. It is assumed that in this determination control example, the "specified number times or more times" is defined as "two times or more times."

Figure 23:
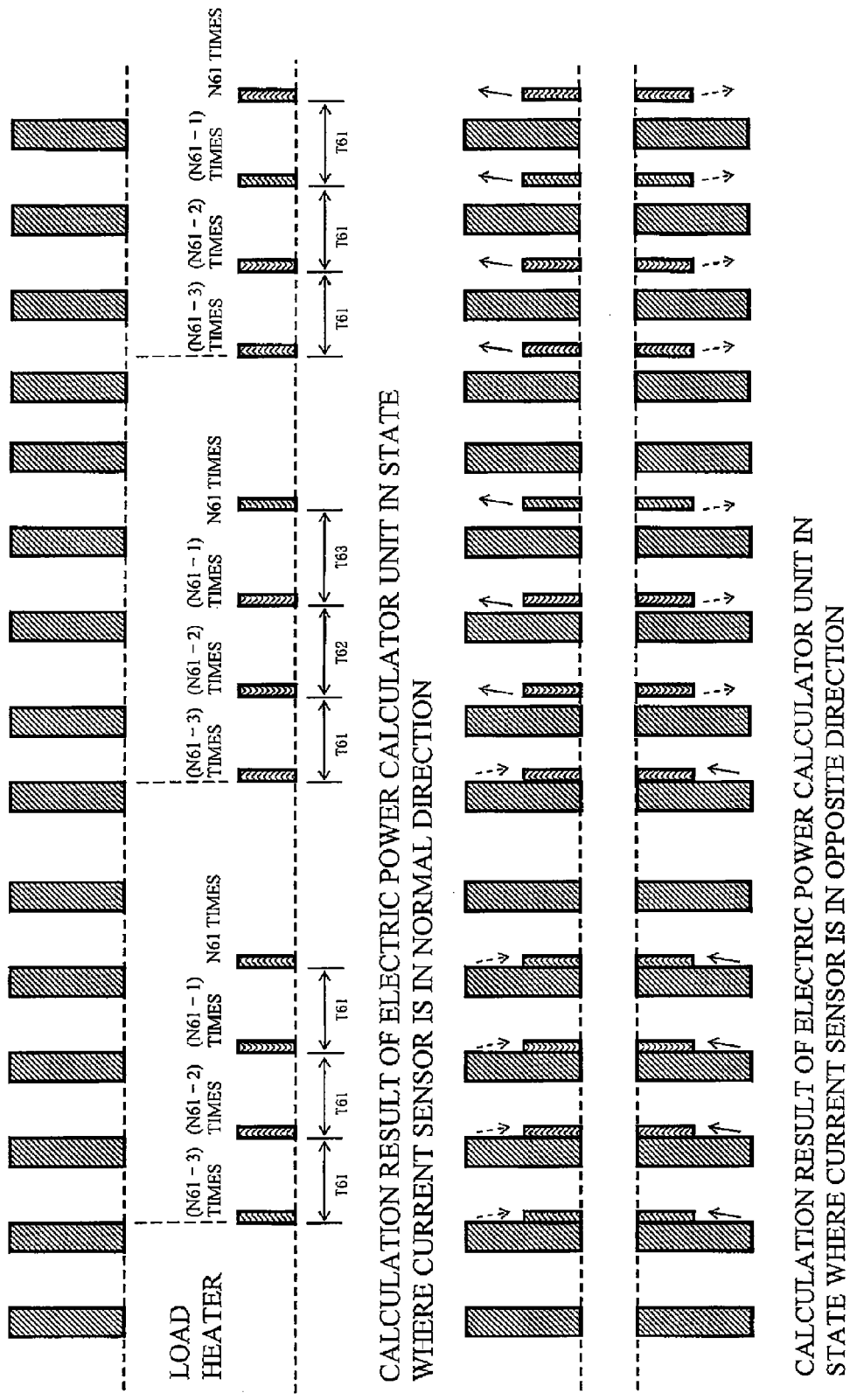
FIG. 23 is a schematic view showing exemplary determination control of Embodiment 2 of the present invention.

Referring to FIG. 23, in the first step, "match determination" occurs four times continuously, and therefore a result of determination as the first step is decided as "match determination." Then, in the second step, in determination control at first time (N61-3) times, "reverse determination" occurs, but in the determination control at the remaining three times continuously, "match determination" occurs. Therefore, result of determination as the second step is decided as "match determination". However, since the same determination result does not occur two times or more times, the controller 8 executes the first step at second time. In the first step at second time, "match determination" occurs four times continuously, and therefore, result of determination as the first step at second time is decided as "match determination".

Since the results of determination as respective steps which are decided in respective steps are the same two times or more times, the control means 8 terminates the determination control. In this case, final determination is "match determination."

The number of times determination control is performed may be different between the first step and the second step. "Determination results are the same a specified number of times or more times" may be "determination results are the same a specified number of times or more times continuously" or "determination results are the same a specified number of times or more times discontinuously."

With the present method, the installation state of the current sensor can be determined more surely.

<Method 5>

In method 5, the control means 8 executes the first step and the second step until results of determination as respective steps which are decided in the respective steps become the same at a specified rate or higher rate, in method 1 or method 2.

This specific example will be described using the determination control example of FIG. 24. In the determination control example of FIG. 24, the first and second steps correspond to those of method 2. The same applies to a case where the first and second steps correspond to those of method 1, which will not be described repetitively. It is assumed that in this determination control example, the "specified rate or higher rate" is defined as "1."

Referring to FIG. 24, in the first step, "match determination" occurs four times continuously, and therefore a result of determination in the first step is decided as "match determination." Then, in the second step, in determination control at first time (N71-3) times, "reverse determination" occurs, but in the determination control at the remaining three times continuously, "match determination" occurs. Therefore, result of determination as the second step is decided as "match determination". However, since the same determination result occurs in respective steps at a rate of "½=0.5," rather than at a rate of "1, the controller 8 executes the first step at second time. In the first step at second time, "match determination" occurs four times continuously, and therefore a result of determination as the first step at second time is decided as "match determination." Since the same determination result occurs in respective steps at a rate of "2/2=1," the control means 8 terminates the determination control. In this case, final determination is "match determination."

The number of times determination control is performed may be different from each other between the first step and the second step.

With the present method, the installation state of the current sensor can be determined more surely.

<Method 6>

In method 6, in any one of method 1 to method 5, the control means 8 executes the first step and the second step alternately.

With the present method, the installation state of the current sensor can be determined more surely.

<Method 7>

In method 7, in any one of method 1 to method 6, the control means 8 executes determination control plural times in such a manner that an interval at which determination control is performed is changed continuously such that each of the intervals is other than the integral multiple of another interval.

To be specific, for example, as shown in FIG. 25, in each step, the determination control is performed in such a manner that the interval is changed continuously such that each of the intervals is other than the integral multiple of another interval, like T111, T112, and T113. The number of intervals is an arbitrary number which is two or more, and the number of steps is an arbitrary number which is two or more.

With the present method, the installation state of the current sensor can be determined more surely.

<Method 8>

In method 8, in any one of method 1 to method 7, the control means 8 executes the first step of performing determination control at first intervals plural times, and determines whether or not the current sensor 5a, 5b is installed in a correct direction based on the determination control performed plural times in the first step. The control means 8 terminates the determination control if the installation direction of the current sensor 5a, 5b is decided. If it is decided that the current sensor 5a, 5b is abnormal, the control means 8 executes the second step of performing determination control at second intervals plural times, at least one of the second intervals being other than an integral multiple of the first interval, and determines whether the installation direction of the current sensor 5a, 5b is correct or opposite based on the determination control performed plural times in the second step.

With the present method, the installation state of the current sensor can be determined more surely.

As described above, in the present embodiment, when the deviation between the electric power values calculated from the current values detected by the current sensor 5a, 5b and the voltage values detected by the voltage sensor 6, just before actuating the internal load heater 7 and just after actuating the internal load heater 7, is less than the second predetermined value, the control means 8 thereafter inverts the positive/negative sign of the calculated electric power value. Thus, regardless of whether or not the distributed power supply apparatus 4 is generating electric power, the installation direction of the current sensor 5a, 5b can be determined, and the electric power value can be corrected. As a result, reliability of the system can be improved.

Embodiment 3

Figure 5:
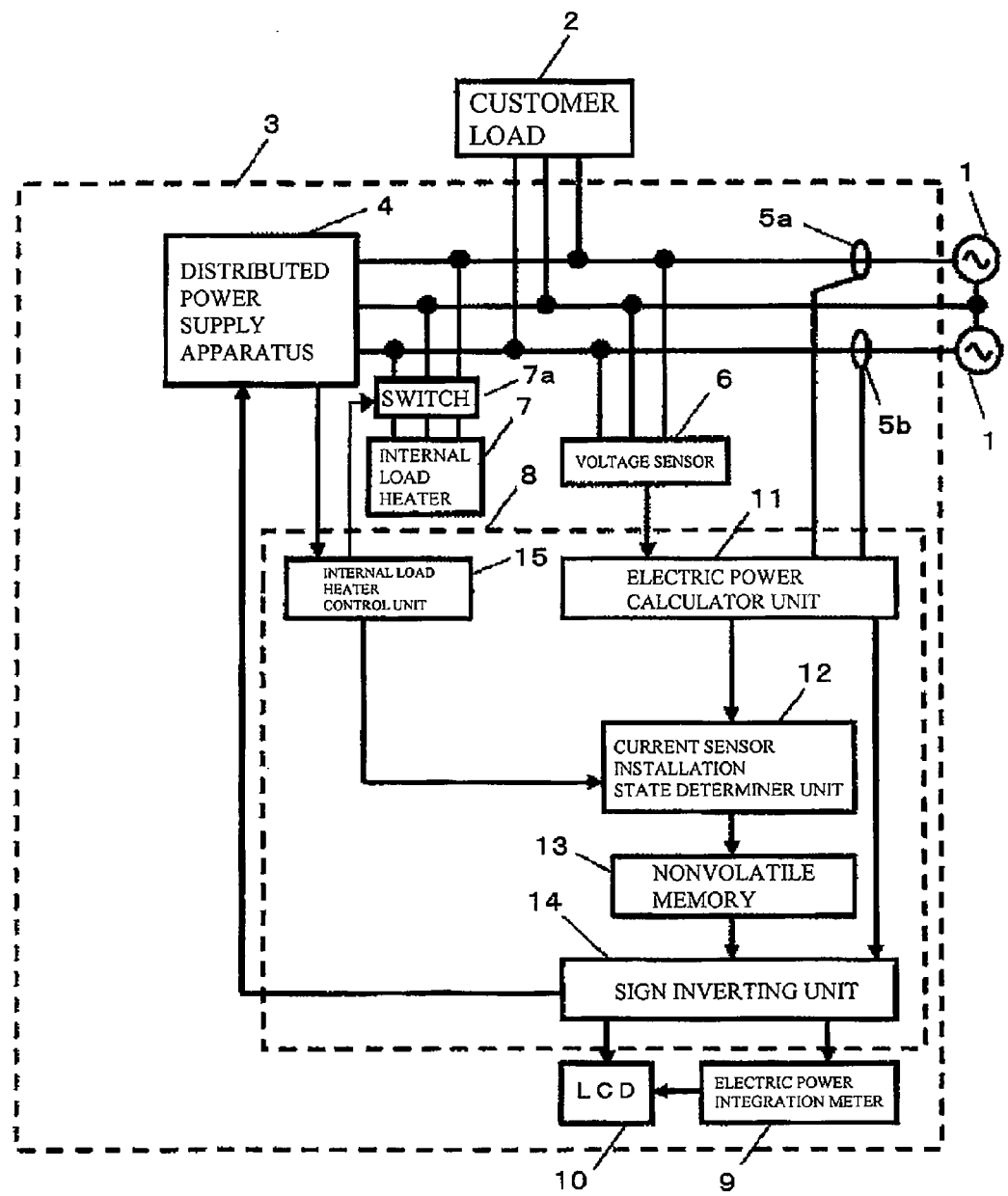
FIG. 5 is a block diagram of a distributed power supply system of Embodiment 3.

FIG. 5 is a block diagram of a distributed power supply system of Embodiment 3.

As shown in FIG. 5, the commercial electric power utility 1 which is a single-phase three-wire AC power supply composed of U-phase, O-phase and W-phase is interconnected with the customer load 2 which consumes AC power supplied from the commercial electric power utility 1.

The distributed power supply system 3 interconnected (interactively connected) to the commercial electric power utility 1 includes the distributed power supply apparatus 4 which outputs generated electric power as AC power. The customer load 2 is coupled to a power line connecting the distributed power supply apparatus 4 to the commercial electric power utility 1. The distribution board is installed at a point at which the distributed power supply apparatus 4 receives power from the commercial electric power utility 1 and which is upstream of the customer load 2. The current sensors 5a, 5b are installed in U-phase and W-phase within the distribution board (in the present embodiment, current sensor 5a in U-phase and current sensor 5b in W-phase), each sensor detecting a magnitude and positive/negative direction of a current. The distributed power supply system 3 includes the voltage sensor 6 which is a voltage detection means for detecting a voltage in the commercial electric power utility 1, the internal load heater 7 which consumes surplus electric power generated in the distributed power supply apparatus 4 to heat water, the switch 7a for turning ON/OFF the internal load heater 7, the control means 8 for controlling the overall distributed power supply system 3, the electric power value integration meter 9 for integrating an electric power value, and the LCD 10 which is a display means and notification means for displaying electric power and an abnormal state of the system.

The control means 8 includes the electric power calculator unit 11 (in the present embodiment, a state where reverse power flow from the distributed power supply system 3 to the commercial electric power utility 1 occurs is minus) for calculating an electric power value for each of U-phase and W-phase by, for example, integrating the current value detected by the current sensor 5a, 5b and the voltage value detected by the voltage sensor 6, the current sensor installation state determiner unit 12 for performing determination as to the installation state of the current sensor 5a, 5b, the nonvolatile memory 13 for storing a result of determination performed by the current sensor installation state determiner unit 12, the sign inverting unit 14 for correcting a positive/negative sign of the electric power value calculated in the electric power calculator unit 11 based on information about the installation direction of the current sensor 5a, 5b which is stored in the nonvolatile memory 13, and the internal load heater control unit 15 for controlling feeding of electric power to the internal load heater 7 via the switch 7a.

Figure 6:
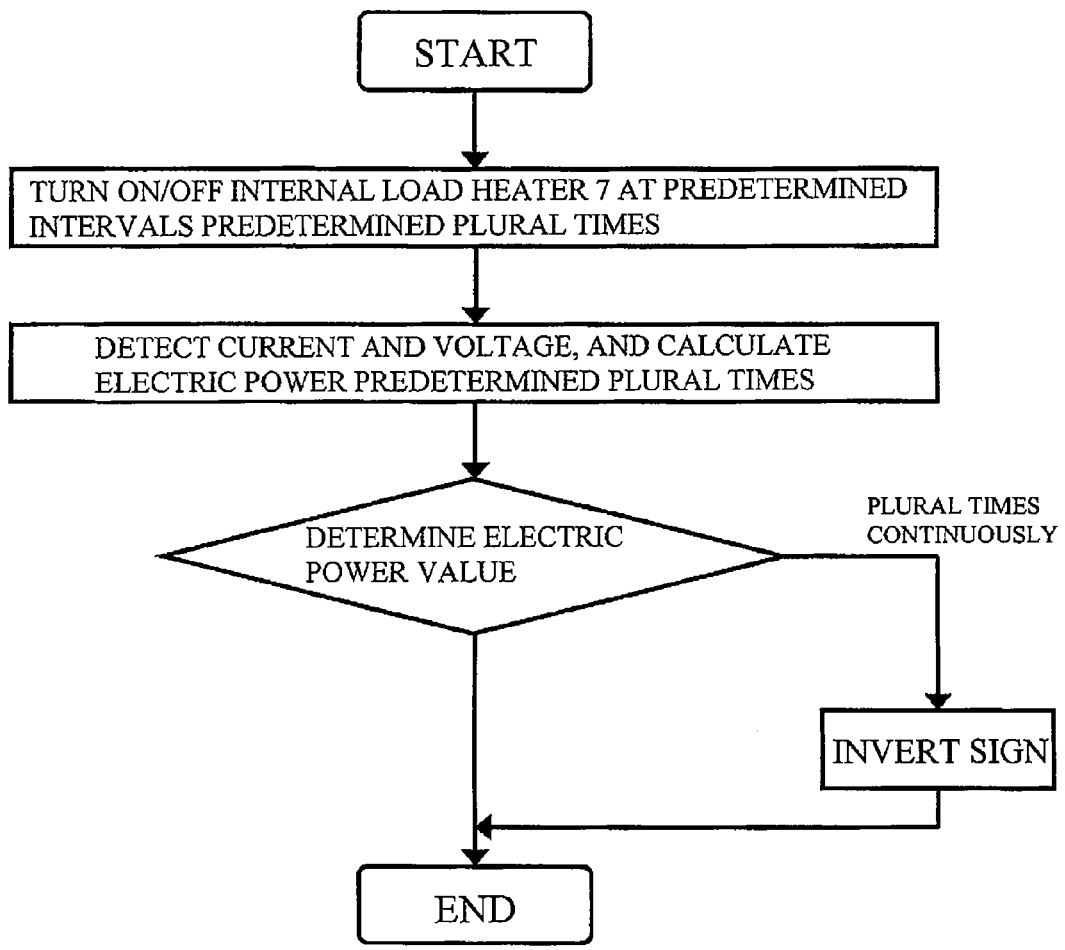
FIG. 6 is a flowchart showing a flow of determination as to the installation state of current sensor in the distributed power supply system of Embodiment 3.

FIG. 6 is a flowchart showing a flow of determination as to the installation state of the current sensor in the distributed power supply system of Embodiment 3 of the present invention. FIG. 3 is a flowchart showing a flow of calculation and correction of electric power in the distributed power supply system of Embodiment 1 of the present invention.

The operation and function of the distributed power supply system configured as described above will be described with reference to FIGS. 5, 3, and 6.

Initially, the control means 8 performs determination as to the installation state of the current sensor 5a, 5b just before starting power generation in the distributed power supply apparatus 4, like Embodiment 1 or Embodiment 2.

To supply electric power from the commercial electric power utility 1 toward the distributed power supply apparatus 4, in a state where the distributed power supply apparatus 4 is not generating electric power, the control means 8 causes the internal load heater control unit 15 to turn ON and OFF the internal load heater 7 at predetermined intervals predetermined plural times (e.g., predetermined interval is one~third seconds and preferably one second, predetermined plural times are third~five times and preferably four times) via the switch 7a. Note that the predetermined plural times are three or more times. This is because, if the predetermined plural times are twice, there is no way to eliminate a chance of misdetermination which could occur due to the fact that supplying of the electric power to the internal load heater 7 synchronizes with the cycle of supplying electric power to the customer load. Therefore, the predetermined intervals have plural intervals. One of the plural intervals in the predetermined intervals is other than an integral multiple of another interval. This makes it possible to prevent at least one of the plural intervals in the predetermined intervals from synchronizing with the cycle of supplying electric power to the customer load.

In a state where the internal load heater 7 is ON, the current sensor 5a, 5b obtains the current value, the voltage sensor 6 obtains the voltage value, and the electric power calculator unit 11 calculates electric power, by for example, integrating the current value and the voltage value detected for each of U-phase and W-phase.

After obtaining the electric power value, the current sensor installation state determiner unit 12 performs determination as to the installation state of the current sensor 5a, 5b, and stores a result of the determination for each of U-phase and W-phase in the nonvolatile memory 13.

In a state where the distributed power supply apparatus 4 is not generating electric power, the electric power is supplied from the commercial electric power utility 1 to the distributed power supply apparatus 4 by turning ON the internal load heater 7. Therefore, if the current sensor 5a, 5b is installed in a normal direction, the electric power value calculated in the electric power calculator unit 11 should be positive and should be an electric power value corresponding to the value of electric power consumption in the internal load heater 7 in ideal cases.

The current sensor installation state determiner unit 12 performs determination as to the installation state based on the electric power value calculated in the electric power calculator unit 11 in the manner as described below. To be specific, as determination reference, a third predetermined value as a positive electric power value and a fourth predetermined value as a negative electric power value are set as thresholds, respectively. If the electric power value is more than the third predetermined value plural times continuously among predetermined plural times, the current sensor installation state determiner unit 12 determines that the installation direction is normal. If the electric power value is less than the fourth predetermined value plural times continuously among predetermined plural times, the current sensor installation state determiner unit 12 determines that the installation direction is opposite. If these two conditions are not met, the determination control continues. In this case, if the electric power value is not more than the third predetermined value and is not less than the fourth predetermined value, the current sensor installation state determiner unit 12 determines that the current sensor is abnormal. That is, it is checked whether or not there is a response to the operation of the internal load heater 7, to prevent misdetermination that there is a failure or the like in the current sensor. Therefore, the absolute value of the third predetermined value and the absolute value of the fourth predetermined value are each suitably set considering a margin corresponding to an error (e.g., each absolute value is set to an electric power value which is about 40~60% of the electric power consumption in the internal load heater 7) with respect to the electric power consumption in the internal load heater 7. The absolute value of the third predetermined value and the absolute value of the fourth predetermined value may be equal to or different from each other. Of course, setting of the absolute values of the electric power values as the thresholds of the determination references is the same as setting of the third and fourth predetermined values which are equal in absolute value.

This determination information is stored as the installation direction information in the nonvolatile memory 13.

The current sensor installation state determiner unit 12 repeats the above determination so long as these conditions are not satisfied. If these conditions are not satisfied within a predetermined time, the current sensor installation state determiner unit 12 displays information for notifying abnormality on the LCD 10. A specific example of this determination control (method) will be described in detail in Embodiment 8.

The method of determination as to the installation state of the current sensor 5a, 5b is the same as that of Embodiment 1 except that the electric power value calculated in the electric power calculator unit 11 is used instead of the deviation between the electric power values calculated in the electric power calculator unit 11 as the determination reference of the installation state of the current sensor, and will not be described.

Thereafter, the electric power is calculated and corrected all the time based on the installation direction information of the current sensor 5a, 5b which is stored in the nonvolatile memory 13, and the electric power integration meter 9 integrates the electric power based on a result of calculation and correction of the electric power, and the LCD 10 displays the electric power.

In a calculation method of the electric power, the current sensor 5a, 5b obtains the current value, the voltage sensor 6 obtains the voltage value, and the electric power calculator unit 11 calculates the electric power, by for example, integrating the current value and the voltage value detected for each of U-phase and W-phase.

In a correction method of the electric power, the sign inverting unit 14 multiplies the electric power value calculated in the electric power calculator unit 11 by multiplying (−1), to invert the positive/negative sign of the electric power value, for each of U-phase and W-phase, when the current sensor installation information stored in the nonvolatile memory 13 is the opposite direction, for each of U-phase and W-phase.

As should be appreciated from the above, in accordance with the present embodiment, if the electric power value calculated based on the current value detected by the current sensor 5a, 5b and the voltage value detected by the voltage sensor 6 is less than the fourth predetermined value in a case where the customer load 7 is actuated and thereby a current flows in the state where the distributed power supply apparatus 4 is not generating electric power, the positive/negative sign of the electric power value calculated thereafter is inverted. Thus, regardless of the state of the customer load 2, the installation direction of the current sensor 5a, 5b can be determined, and the electric power value can be corrected. As a result, reliability of the system can be improved.

Embodiment 4

The block diagram of a distributed power supply system of Embodiment 4 of the present invention is identical to the block diagram of the distributed power supply system of Embodiment 3 shown in FIG. 5.

As shown in FIG. 5, the commercial electric power utility 1 which is a single-phase three-wire AC power supply composed of U-phase, O-phase and W-phase is interconnected with the customer load 2 which consumes AC power supplied from the commercial electric power utility 1.

The distributed power supply system 3 interconnected (interactively connected) to the commercial electric power utility 1 includes the distributed power supply apparatus 4 which outputs generated electric power as AC power, the customer load 2, current sensors 5a, 5b installed in U-phase and W-phase within a distribution board installed at a point at which the distributed power supply apparatus 4 receives power from the commercial electric power utility 1 and which is upstream of the customer load 2 (in the embodiment, current sensor 5a in U-phase and current sensor 5b in W-phase), each current sensor detecting a magnitude and positive or negative direction of a current, the voltage sensor 6 which is a voltage detection means for detecting a voltage in the commercial electric power utility 1, the internal load heater 7, the switch 7a for turning ON/OFF the internal load heater 7, the control means 8 for controlling the distributed power supply system 3, the electric power integration meter 9 for integrating an electric power value, and a LCD 10 which is a display means and notification means for displaying electric power and an abnormal state of the system.

The control means 8 includes the electric power calculator unit 11 for calculating electric power for each of U-phase and W-phase based on the product of the current value detected by the current sensor 5a, 5b and the voltage value detected by the voltage sensor 6 (in the present embodiment, a state where reverse power flow from the distributed power supply system 3 to the commercial electric power utility 1 occurs is minus), the current sensor installation state determiner unit 12 for performing determination as to the installation state of the current sensor 5a, 5b, the nonvolatile memory 13 for storing a result of determination performed by the current sensor installation state determiner unit 12, the sign inverting unit 14 for correcting a positive/negative sign of the electric power value calculated in the electric power calculator unit 11 based on information about the installation direction of the current sensor 5a, 5b which is stored in the nonvolatile memory 13, and the internal load heater control unit 15 for controlling feeding of electric power to the internal load heater 7 via the switch 7a.

Figure 7:
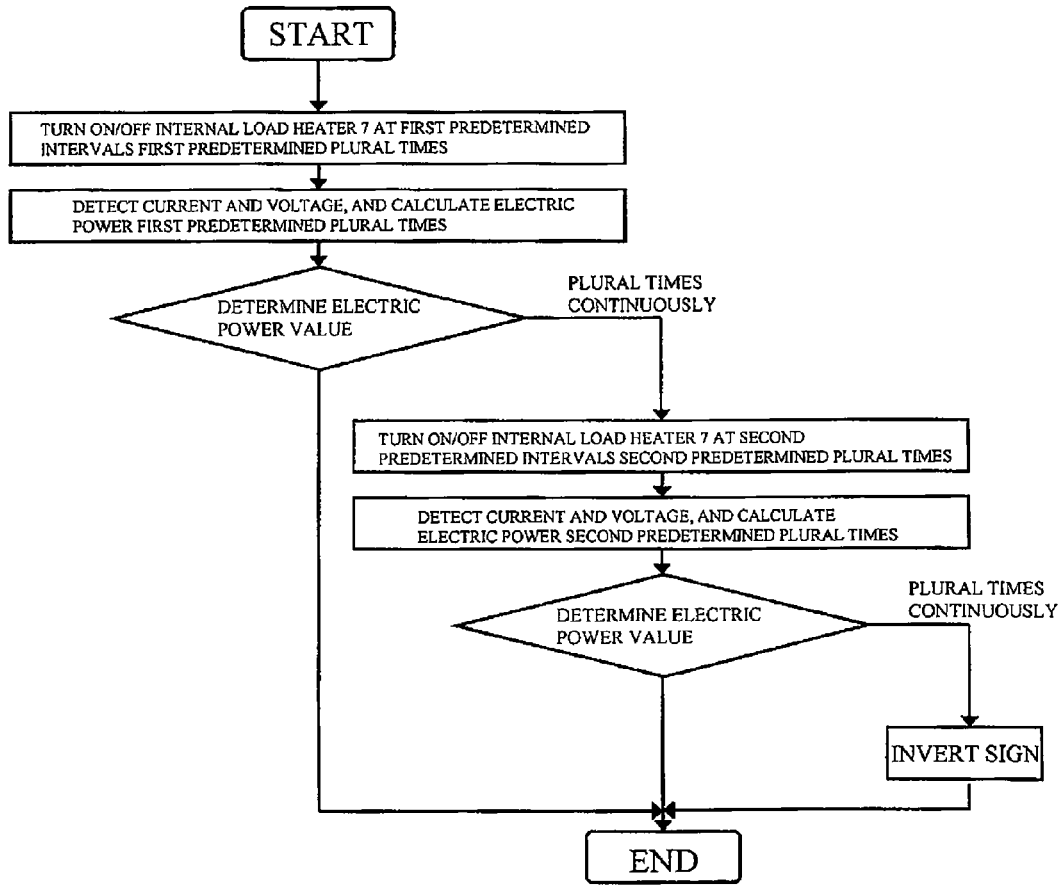
FIG. 7 is a flowchart showing a flow of determination as to the installation state of current sensor in a distributed power supply system of Embodiment 4.

FIG. 7 is a flowchart showing a flow of determination as to the installation state of the current sensor in the distributed power supply system of Embodiment 4 of the present invention. FIG. 3 is a flowchart showing a flow of calculation and correction of electric power in the distributed power supply system of Embodiment 4 of the present invention.

The operation and function of the distributed power supply system configured as described above will be described with reference to FIGS. 5, 3, and 7.

Initially, the control means 8 performs determination as to the installation state of the current sensor 5a, 5b just before starting power generation in the distributed power supply apparatus 4.

To supply electric power from the commercial electric power utility 1 toward the distributed power supply apparatus 4, in a state where the distributed power supply apparatus 4 is not generating electric power, the control means 8 causes the internal load heater control unit 15 to actuate the internal load via the switch 7a at first predetermined intervals first predetermined plural times in the first step and then causes the internal load heater control unit 15 to turn ON and OFF the internal load heater 7 at second predetermined intervals second predetermined plural times in the second step.

In a state where the internal load heater 7 is ON, the current sensor 5a, 5b obtains the current value, the voltage sensor 6 obtains the voltage value, and the electric power calculator unit 11 calculates electric power, by for example, performing integration based on the current value and the voltage value detected for each of U-phase and W-phase.

After obtaining the electric power value, the current sensor installation state determiner unit 12 performs determination as to the installation state of the current sensor 5a, 5b, and stores a result of the determination for each of U-phase and W-phase in the nonvolatile memory 13.

Typically, in a state where the distributed power supply apparatus 4 is not generating electric power, the electric power is supplied from the commercial electric power utility 1 toward the distributed power supply apparatus 4 by turning ON the internal load heater 7. Therefore, if the current sensor 5a, 5b is installed in the normal direction, the electric power value calculated in the electric power calculator unit 11 should be positive and should be an electric power value corresponding to the value of electric power consumption in the internal load heater 7 in ideal cases.

The current sensor installation state determiner unit 12 performs determination as to the installation state based on the electric power value calculated in the electric power calculator unit 11 and the third predetermined value and the fourth predetermined value described in Embodiment 3, in the manner as described below. It is determined whether or not the electric power value is more than the third predetermined value plural times continuously among first predetermined plural times in the first step, and it is determined whether or not the electric power value is more than the third predetermined value plural times continuously among second predetermined plural times in the second step. If it is determined that the electric power value is more than the third predetermined value plural times continuously in the first step and in the second step, it is determined that the installation direction is a positive direction. Further, it is determined whether or not the electric power value is less than the fourth predetermined value plural times continuously among first predetermined plural times in the first step, and it is determined whether or not the electric power value is less than the fourth predetermined value plural times continuously among second predetermined plural times in the second step. If it is determined that the electric power value is less than the fourth predetermined value plural times continuously in the first step and in the second step, it is determined that the installation direction is a negative direction. Moreover, it is determined whether or not the electric value is not more than the third predetermined value and not less than the fourth predetermined value plural times continuously among first predetermined plural times in the first step, and it is determined whether or not the electric value is not more than the third predetermined value and not less than the fourth predetermined value plural times continuously among second predetermined plural times in the second step. If it is determined that the electric power value is not more than the third predetermined value and not less than the fourth predetermined value plural times continuously in the first step and in the second step, it is determined that the current sensor is abnormal. The information is stored in the nonvolatile memory 13 as the installation direction information.

The current sensor installation state determiner unit 12 repeats the first step and the second step so long as these conditions are not satisfied. If these conditions are not satisfied within a predetermined time, the current sensor installation state determiner unit 12 displays information for notifying abnormality on the LCD 10. Specific example of the determination control (determination method) will be described in detail in Embodiment 8. The method of determination as to the installation state of the current sensor 5a, 5b is identical to that in Embodiment 2 except that the electric power value calculated in the electric power calculator unit 11 is used instead of the deviation between the electric power values calculated in the electric power calculator unit 11 as the determination reference of the installation state of the current sensor, and will not be described.

Thereafter, the electric power is calculated and corrected all the time based on the installation direction information of the current sensor 5a, 5b which is stored in the nonvolatile memory 13, and the electric power integration meter 9 integrates the electric power based on a result of calculation and correction of the electric power, and the LCD 10 displays the electric power.

In a calculation method of the electric power, the current sensor 5a, 5b obtains the current value, the voltage sensor 6 obtains the voltage value, and the electric power calculator unit 11 calculates electric power, by for example, performing integration based on the current value and the voltage value detected for each of U-phase and W-phase.

In a correction method of the electric power, the sign inverting unit 14 multiplies the electric power value calculated in the electric power calculator unit 11 by (−1), to invert the positive/negative sign of the electric power value, for each of U-phase and W-phase, when the current sensor installation information stored in the nonvolatile memory 13 is the opposite direction, for each of U-phase and W-phase.

As should be appreciated from the above, in accordance with the present embodiment, if the electric power value calculated based on the current value detected by the current sensor 5a, 5b and the voltage value detected by the voltage sensor 6 is less than the fourth predetermined value in a case where the internal load heater 7 is actuated and thereby a current flows in the state where the distributed power supply apparatus 4 is not generating electric power, the positive/negative sign of the electric power value calculated thereafter is inverted. Thus, regardless of the state of the customer load 2, the installation direction of the current sensor 5a, 5b can be determined, and the electric power value can be corrected. As a result, reliability of the system can be improved.

Embodiment 5

Figure 8:
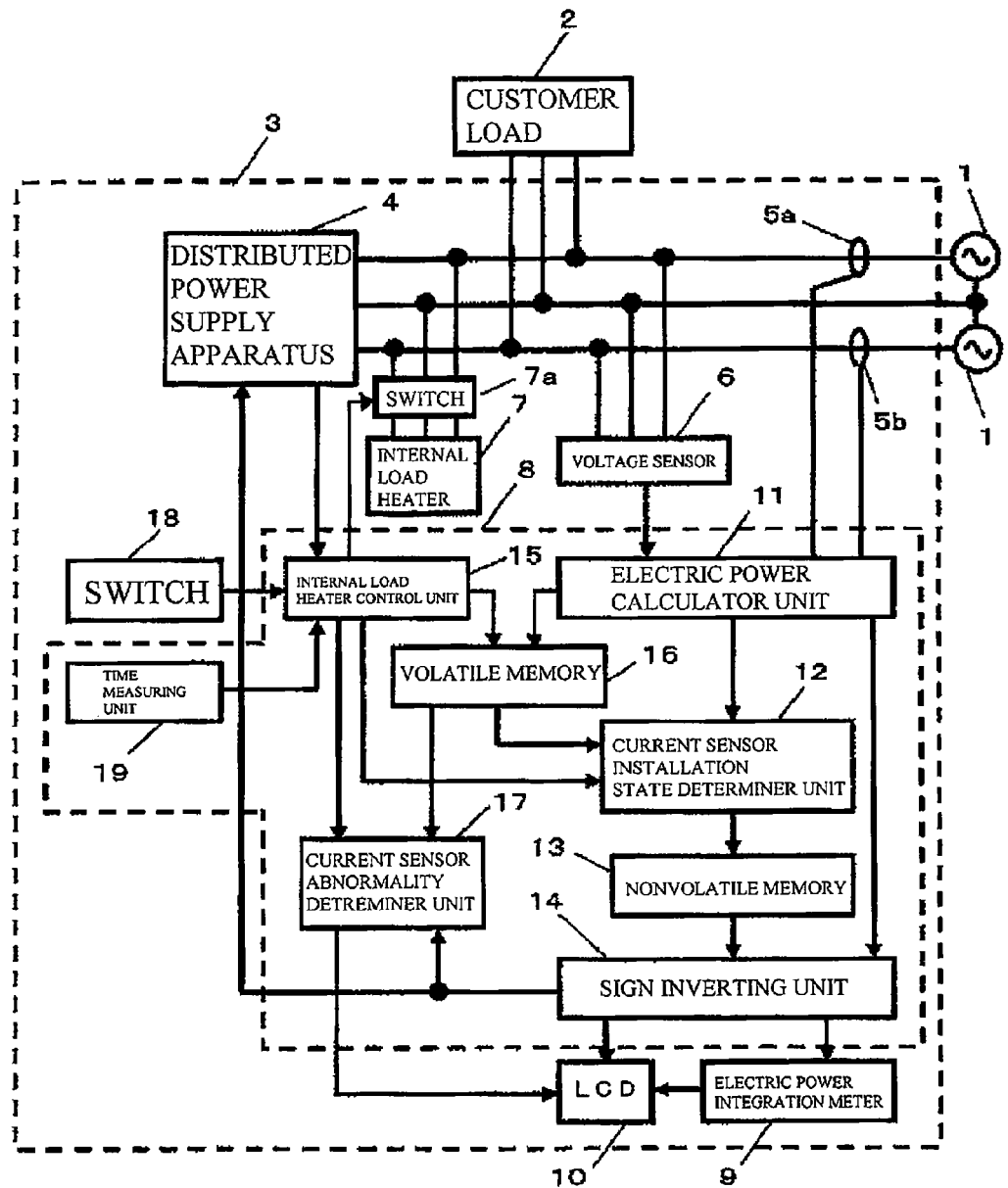
FIG. 8 is a block diagram of a distributed power supply system of Embodiment 5.

FIG. 8 is a block diagram of a distributed power supply system according to Embodiment 5 of the present invention. The distributed power supply system 3 includes a switch 18 as a setting means in addition to the configuration of FIG. 5. The control means 8 includes a current sensor abnormality determiner unit 17 for determining whether or not there is an installation problem, disconnection or failure in the current sensor 5a, 5b, and a time measuring unit 19 for measuring a time, in addition to the configuration of FIG. 5.

Figure 9:
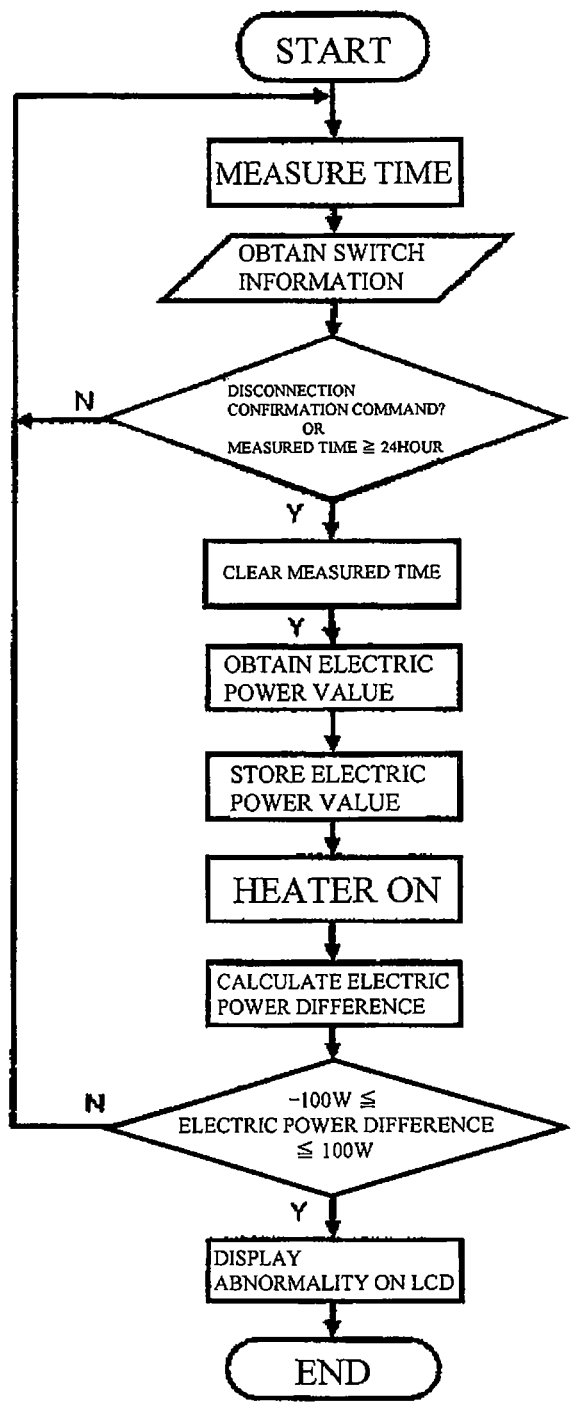
FIG. 9 is a flowchart showing a flow of determination as to abnormality of the current sensor in the distributed power supply system of Embodiment 5.
Figure 10:
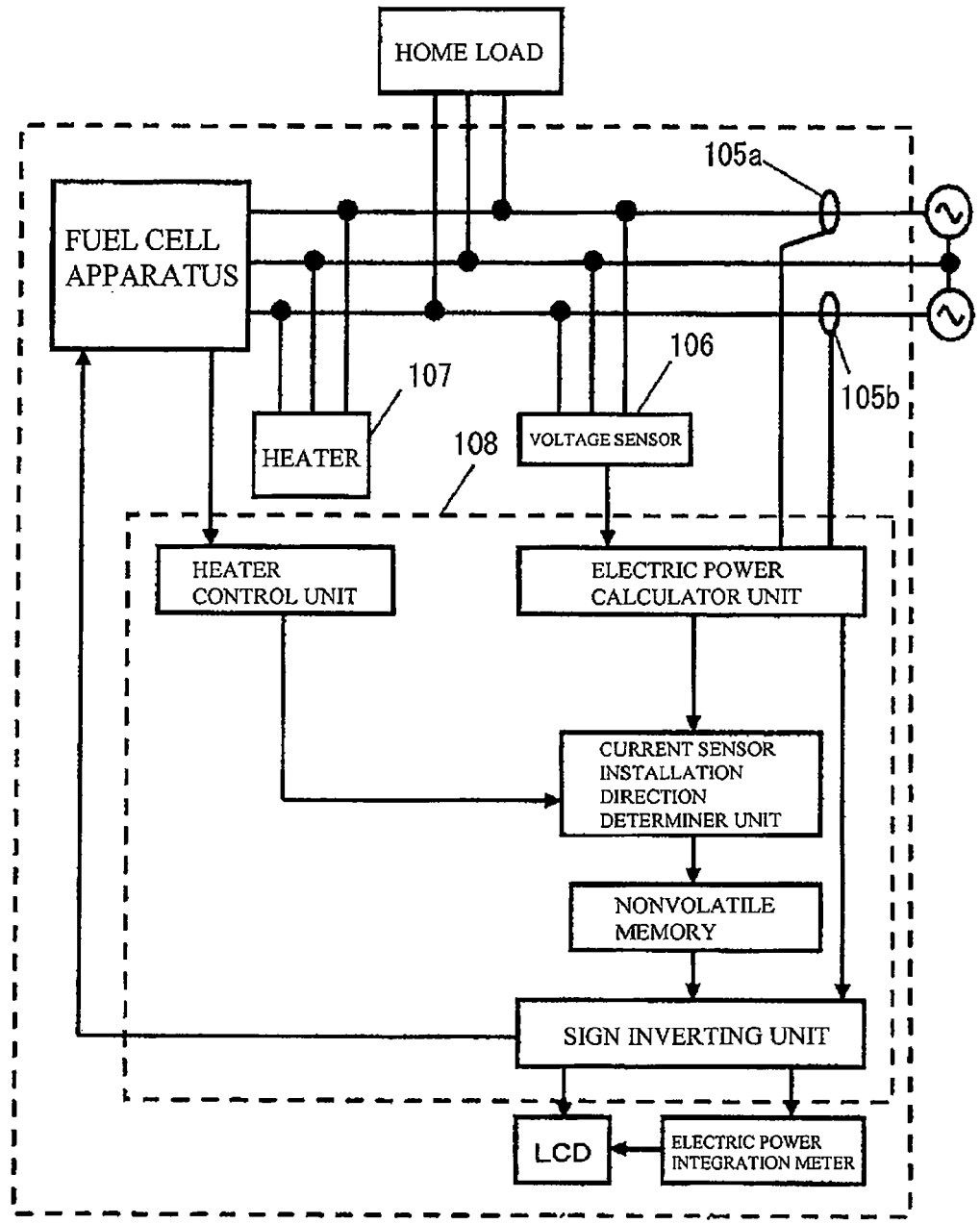
FIG. 10 is a block diagram of a conventional distributed power supply system.

FIG. 9 is a flowchart showing a flow of determination as to failure abnormality of the current sensor in the distributed power supply system of Embodiment 5.

The operation and function of the distributed power supply system 3 configured as described above will be described with reference to FIGS. 8, 9, and 3.

The control means 8 determines whether or not the current sensor 5a, 5b is abnormal, just before the distributed power supply apparatus 4 starts power generation, in response to the operation of the switch 18 to address a change in the installation direction of the current sensor 5a, 5b, which is performed by a person, or on a regular basis (e.g., every 24 hours) based on the time measured by the time measuring unit 19 to address a failure of the current sensor 5a, 5b after the power is ON.

Hereinafter, an abnormality determination method of the current sensor 5a, 5b will be explained.

The control means 8 causes the time measuring unit 19 to measure time and obtains an operation signal from the switch 18. Based on this information, on a regular basis (e.g., every 24 hour) based on the time measured by the time measuring unit 19, or upon reception of a signal corresponding to an abnormality determination command of the current sensor 5a, 5b from the switch 18 (in the present embodiment, the switch 18 outputs LOW signal in normal cases and outputs HIGH signal when it is pressed for initiating abnormality determination), the control means 8 clears the time measured by the time measuring unit 19, obtains a current electric power value (electric power calculation is shown in FIG. 3), and stores it in the volatile memory 16. Then, the control means 8 causes the internal load heater control unit 15 to turn ON the internal load heater 7 via the switch 7a.

After turning ON the internal load heater 7, the current sensor abnormality determiner unit 17 obtains a current electric power value again (calculation of electric power is shown in FIG. 3), and determines whether or not the current sensor 5a, 5b is abnormal, based on the obtained electric power value and the electric power value stored in the volatile memory 16.

Regardless of whether or not the distributed power supply apparatus 4 is generating electric power, or whether or not reverse power flow is occurring in a state where the distributed power supply apparatus 4 is generating electric power, a difference between two electric power values just before turning ON the internal load heater 7 and just after turning ON the internal load heater 7 (in the present embodiment, difference between electric power values=electric power value just after tuning ON the internal load heater 7 minus electric power value just before tuning ON the internal load heater 7) is zero in ideal cases, if there is an installation problem, disconnection, or a failure in the current sensor 5a, 5b.

In the abnormality determination performed by the current sensor abnormality determiner unit 17, it is determined that the current sensor 5a, 5b is abnormal if the difference between the two electric power values is within a predetermined value (in the present embodiment, −100 W~100 W), taking measurement errors of the current sensor 5a, 5b and the voltage sensor 6 into account.

After the abnormality determination of the current sensor 5a, 5b terminates, the control means 8 causes the internal load heater control unit 15 to turn OFF the internal load heater 7 via the switch 7a, sends abnormality information to the LCD 10, and causes the LCD 10 to display information about abnormality of the current sensor, if there is an abnormality in the current sensor 5a, 5b.

As described above, in the present embodiment, the control means 8 determines that the current sensor is abnormal if the deviation between the electric power values calculated based on the current values detected by the current sensor 5a, 5b and the voltage values detected by the voltage detecting means, just before actuating the internal load heater 7 and just after actuating the internal load heater 7, is within the predetermined value, and the LCD 10 notifies abnormality if the control means 8 determines that the current sensor 5a, 5b is abnormal. This makes it possible to know an installation problem of the current sensor 5a, 5b during installation work or maintenance operation, and know disconnection or failure of the current sensor 5a, 5b after installing the system. As a result, reliability of the installation work, reliability of the maintenance operation, and reliability of the system can be improved.

Since the control means 8 causes the internal load heater 7 to be actuated in accordance with the operation command from the switch 18, in Embodiment 5, it becomes possible to always perform determination as to the installation state of the current sensor 5a, 5b, correction of the electric power value, and detection of an abnormality due to the installation problems of the current sensor 5a, 5b such as disconnection or disengagement, during the installation work and maintenance operation. As a result, the installation work and maintenance operation can be carried out smoothly.

Since the control means 8 measures the time and actuates the internal load heater 7 on a regular basis in Embodiment 5, it becomes possible to perform determination as to the installation state of the current sensor 5a, 5b, correction of the electric power value, and detection of an abnormality of the current sensor 5a, 5b such as failure, disconnection or disengagement, on a regular basis. As a result, reliability of the system can be improved.

Embodiment 6

In Embodiment 1 to 4, the control means 8 decides the same determination result as the determination result as one step when the same determination result of the determination control occurs "plural times continuously" in one step. On the other hand, in Embodiment 6 of the present invention, if the same determination result of the determination control occurs "specified times or more times" in one step, the control means 8 decides the same determination result as the determination result as one step. Note that a case where the same determination result occurs "specified times or more times" continuously is identical to that in Embodiment 1 to 4. The present embodiment is different from Embodiments 1 to 4 in that a case where the same determination result occurs "specified times or more times" discontinuously is included in the present embodiment.

With the present method, the installation state of the current sensor can be determined more surely.

Embodiment 7

In Embodiment 2 to 4, the control means 8 decides the same determination result as the determination result as one step, when the same determination result of the determination control occurs "plural times continuously" in one step. On the other hand, in Embodiment 7 of the present invention, if the same determination result of the determination control occurs at "a specified rate or higher rate" in one step, the control means 8 decides the same determination result as the determination result as one step. Note that a case where the same determination result occurs "at a specified rate or higher rate" continuously is identical to that in Embodiment 1 to 4. The present embodiment is different from Embodiments 1 to 4 in that a case where the same determination result occurs "at a specified rate or higher" discontinuously is included in the present embodiment.

With the present method, the installation state of the current sensor can be determined more surely.

Embodiment 8

In Embodiment 8, there is further provided a notification means for notifying an abnormality in any one of Embodiments 1 to 4, 6 and 7, the control means 8 decides final determination result of the installation state of the current sensor 5a, 5b based on the determination control performed plural times, and causes the notification means to notify an abnormality if the control means 8 cannot decide the final determination result within a predetermined time. The predetermined time is suitably set in view of, for example, a start-up time of the distributed power supply apparatus 4. The abnormality notification means may be, for example, the LCD 10, a speaker, an alarm lamp, or other abnormality notification device (not shown).

In the present embodiment, it is possible to notify problems associated with installation, such as an installation direction mistake, disconnection or disengagement of the current sensor, during an installation work and maintenance operation, and to notify failures of the current sensor such as disconnection or disengagement, after installing the system. Thus, reliability of the installation work, reliability of the maintenance operation, and reliability of the system can be improved.

Embodiment 9

In Embodiment 9 of the present invention, in any one of Embodiments 1 to 4, and 6 to 8, the control means 8 stores in a memory means (not shown), an interval of determination control at which the control means 8 decides that the installation state of the current sensor 5a, 5b is correct, and uses this as a default interval for next determination control.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

As should be understood from the foregoing, a distributed power supply system of the present invention is capable of performing determination as to an installation state of a current sensor and of correcting an electric power value regardless of a state of a customer load by consuming AC power in an internal load to thereby surely supply electric power from a commercial electric power utility to a distributed power supply apparatus, thus improving reliability of the system. Therefore, the distributed power supply system of the present invention is applicable to uses of distributed power supply apparatuses and the like such as a fuel cell apparatus, a solar light power generation apparatus, a wind power generation apparatus, and a solar heat power generation apparatus.

The invention claimed is:

1. A distributed power supply system comprising:
a distributed power supply apparatus for supplying electric power to a customer load interactively with a commercial electric power utility;
an internal load configured to be supplied with electric power from the commercial electric power utility;
a current sensor for detecting a magnitude of a current and a direction of the current, the current being in a location closer to the commercial electric power utility than the internal load and the customer load;
a controller; and
a voltage detector for detecting a voltage of the electric power supplied from the commercial electric power supply utility to at least one of the internal load and the customer load, wherein:
in a state where the distributed power supply apparatus is not generating the electric power, the controller:
causes the internal load to actuate,
performs determination control as to an installation state of the current sensor plural times based on a value detected by the current sensor, and
performs the determination control in such a manner that at least one of plural intervals at which the determination control is performed is set to an interval other than an integral multiple of another interval of the plural intervals,
in the determination control, the controller determines that the current sensor is abnormal when a deviation between an electric power value calculated from a value detected by the current sensor and a value detected by the voltage detector just before the internal load is actuated, and an electric power value calculated from a value detected by the current sensor and a value detected by the voltage detector just after the internal load is actuated, is not more than a first predetermined value which is a positive electric power value and is not less than a second predetermined value which is a negative electric power value,
the controller determines that the current sensor is installed in an opposite direction when the electric power values are less than the second predetermined value, and
the controller determines that the current sensor is installed in a correct direction when the electric power values are more than the first determined value.

2. The distributed power supply system according to claim 1,
wherein the controller executes a first step of performing the determination control at first intervals plural times and a second step of performing the determination control at second intervals plural times;
the controller decides, for each step, a result of determination as to the installation state of the current sensor as each step, based on the determination control performed plural times in each step; and
the controller executes the second step in such a manner that at least one of the second intervals is set to an interval other than an integral multiple of the first interval.

3. The distributed power supply system according to claim 2,
wherein the controller executes the second step in such a manner that all of the second intervals are set equal.

4. The distributed power supply system according to claim 2,
wherein the controller executes the first step and the second step until results of determination as respective steps which are decided in the steps of last plural times become the same.

5. The distributed power supply system according to claim 2,
wherein the controller executes the first step and the second step until results of determination as respective steps which are decided in the steps become the same at a specified rate or higher rate.

6. The distributed power supply system according to claim 2,
wherein when determination results of the determination control become the same at specified times or more times in the first step or in the second step, the same determination result is decided as determination result as the corresponding step.

7. The distributed power supply system according to claim 2,
wherein when determination results of the determination control become the same at a specified rate or higher rate in the first step or in the second step, the same determination result is decided as determination result as the corresponding step.

8. The distributed power supply system according to claim 1,
wherein the controller performs the determination control plural times in such a manner that the interval at which the determination control is performed is changed continuously such that each of the intervals is other than an integral multiple of another interval.

9. The distributed power supply system according to claim 1,
wherein when it is determined that the current sensor is installed in the opposite direction based on the determination control performed plural times, the controller inverts a sign of the electric power value calculated from the value detected by the current sensor and the value detected by the voltage sensor, and outputs an electric power value with the inverted sign.

10. The distributed power supply system according to claim 1,
wherein the controller executes a first step of performing the determination control at first intervals plural times, determines whether or not the current sensor is installed in a correct direction based on the determination control performed plural times in the first step, terminates the determination control when the installation direction of the current sensor is decided, and executes a second step of performing the determination control plural times at second intervals at least one of which is an interval other than an integral multiple of the first interval to determine whether the current sensor is installed in the correct direction or in the opposite direction based on the determination control performed plural times in the second step when it is decided that the current sensor is abnormal.

11. A distributed power supply system comprising:
a distributed power supply apparatus for supplying electric power to a customer load interactively with a commercial electric power utility;
an internal load configured to be supplied with electric power from the commercial electric power utility;
a current sensor for detecting a magnitude of a current and a direction of the current, the current being in a location closer to the commercial electric power utility than the internal load and the customer load;
a controller; and
a voltage detector for detecting a voltage of the electric power supplied from the commercial electric power supply utility to at least one of the internal load and the customer load, wherein:
in a state where the distributed power supply apparatus is not generating the electric power, the controller:
causes the internal load to actuate,
performs determination control as to an installation state of the current sensor plural times based on a value detected by the current sensor, and
performs the determination control in such a manner that at least one of plural intervals at which the determination control is performed is set to an interval other than an integral multiple of another interval of the plural intervals,
in the determination control, the controller determines that the current sensor is abnormal, when an electric power value calculated from a value detected by the current sensor and a value detected by the voltage detector is not more than a third predetermined value which is a positive electric power value and is not less than a fourth predetermined value which is a negative electric power value,
the controller determines that the current sensor is installed in an opposite direction when the electric power value is less than the fourth predetermined value, and
the controller determines that the current sensor is installed in a correct direction when the electric power value is more than the third determined value.

12. The distributed power supply system according to claim 11, wherein:
the controller executes a first step of performing the determination control at first intervals plural times and a second step of performing the determination control at second intervals plural times,
the controller decides, for each step, a result of determination as to the installation state of the current sensor as each step, based on the determination control performed plural times in each step, and
the controller executes the second step in such a manner that at least one of the second intervals is set to an interval other than an integral multiple of the first interval.

13. The distributed power supply system according to claim 12,
wherein the controller executes the second step in such a manner that all of the second intervals are set equal.

14. The distributed power supply system according to claim 12,
wherein the controller executes the first step and the second step until results of determination as respective steps which are decided in the steps of last plural times become the same.

15. The distributed power supply system according to claim 12,
wherein the controller executes the first step and the second step until results of determination as respective steps which are decided in the steps become the same at a specified rate or higher rate.

16. The distributed power supply system according to claim 12,
wherein when determination results of the determination control become the same at specified times or more times in the first step or in the second step, the same determination result is decided as determination result as the corresponding step.

17. The distributed power supply system according to claim 12,
wherein when determination results of the determination control become the same at a specified rate or higher rate in the first step or in the second step, the same determination result is decided as determination result as the corresponding step.

18. The distributed power supply system according to claim 11,
wherein the controller performs the determination control plural times in such a manner that the interval at which the determination control is performed is changed continuously such that each of the intervals is other than an integral multiple of another interval.

19. The distributed power supply system according to claim 11,
wherein when it is determined that the current sensor is installed in the opposite direction based on the determination control performed plural times, the controller inverts a sign of the electric power value calculated from the value detected by the current sensor and the value detected by the voltage sensor, and outputs an electric power value with the inverted sign.

20. The distributed power supply system according to claim 11,
wherein the controller executes a first step of performing the determination control at first intervals plural times, determines whether or not the current sensor is installed in a correct direction based on the determination control performed plural times in the first step, terminates the determination control when the installation direction of the current sensor is decided, and executes a second step of performing the determination control plural times at second intervals at least one of which is an interval other than an integral multiple of the first interval to determine whether the current sensor is installed in the correct direction or in the opposite direction based on the determination control performed plural times in the second step when it is decided that the current sensor is abnormal.

* * * * *